US012231857B2

(12) United States Patent
Chung

(10) Patent No.: US 12,231,857 B2
(45) Date of Patent: Feb. 18, 2025

(54) SYSTEM AND METHOD FOR PERSONALIZED SOUND MODIFICATION

(71) Applicant: King Chung, Lisle, IL (US)

(72) Inventor: King Chung, Lisle, IL (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 28 days.

(21) Appl. No.: 17/738,264

(22) Filed: May 6, 2022

(65) Prior Publication Data

US 2022/0369054 A1 Nov. 17, 2022

Related U.S. Application Data

(60) Provisional application No. 63/201,643, filed on May 7, 2021.

(51) Int. Cl.
*H04R 25/00* (2006.01)

(52) U.S. Cl.
CPC ........... *H04R 25/70* (2013.01); *H04R 25/502* (2013.01); *H04R 2225/39* (2013.01); *H04R 2430/01* (2013.01)

(58) Field of Classification Search
CPC .... H04R 25/70; H04R 2225/39; H04R 25/75; H04R 2225/00; H04R 25/00; H04R 25/502; H04R 2430/01

(Continued)

(56) References Cited

U.S. PATENT DOCUMENTS 8,081,780 B2 12/2011 Goldstein et al.
8,285,344 B2 10/2012 Kahn et al.
(Continued)

FOREIGN PATENT DOCUMENTS

CN 101862195 10/2010
CN 202998462 6/2013
(Continued)

OTHER PUBLICATIONS

Wilson, B.S. et al., "Global hearing healthcare: new findings and perspectives", Lancet, vol. 390, pp. 2503-2515, (2017).
(Continued)

*Primary Examiner* — Norman Yu
(74) *Attorney, Agent, or Firm* — EVAN LAW GROUP LLC

(57) ABSTRACT

A method for personalized sound modification, with a personal sound system having a microphone; a user device which includes a processor, computer readable medium, and optionally the microphone; and a sound output device; is provided. The method includes: providing a user hearing profile including lower and upper limits of the user's auditory dynamic range at a plurality of sound frequencies, prepared with the personal sound system; receiving a sound signal from the microphone; optionally separating the sound signal into a plurality of frequency channels; amplifying or attenuating sound frequencies in the sound signal which have a volume level outside the lower or upper limits of the user's auditory dynamic range, respectively, and forming a modified sound signal with which the sound output device will produce sounds within the user's auditory dynamic range; and providing the modified sound signal to the sound output device.

19 Claims, 13 Drawing Sheets

(58) Field of Classification Search
USPC ........................................ 381/60, 312, 58, 74
See application file for complete search history.

(56) References Cited

U.S. PATENT DOCUMENTS

| | | | | |
|---|---|---|---|---|
| 10,820,121 | B2 | 10/2020 | Lunner et al. | |
| 2002/0076073 | A1 | 6/2002 | Taenzer et al. | |
| 2011/0135129 | A1* | 6/2011 | Neal .................. | A61N 1/36038 381/320 |
| 2013/0337796 | A1* | 12/2013 | Suhami .................. | H04R 25/00 381/103 |
| 2016/0241972 | A1 | 8/2016 | Gobeli et al. | |
| 2017/0042739 | A1* | 2/2017 | O'Neill .................. | A61H 23/02 |
| 2021/0329389 | A1 | 10/2021 | Pandey et al. | |

FOREIGN PATENT DOCUMENTS

| | | |
|---|---|---|
| CN | 210927977 | 7/2020 |
| JP | 2000295696 | 10/2000 |
| KR | 101482420 | 1/2015 |
| WO | 2009/001559 | 6/2007 |

OTHER PUBLICATIONS

Ching, T.Y.C. et al., "Outcomes of early- and late-identified children at 3 years of age: Findings from a prospective population-based study", Ear and Hearing, vol. 34, No. 5, pp. 535-552, (2013).
Ronner, E.A. et al., "Quality of life in children with sensorineural hearing loss", Otolaryngology—Head and Neck Surgery, vol. 162, No. 1, pp. 129-136, (2020).
Punch, J.L. et al., "Hearing loss and quality of life", Journal of Communication Disorders, vol. 78, pp. 33-45, (2019).
Bott, A. et al., "A scoping review of studies investigating hearing loss, social isolation and/or loneliness in adults", International Journal of Audiology, vol. 60, sup. 2, pp. s30-s46, (2021).
Chen, D.S. et al., "Association between hearing impairment and self-reported difficulty in physical functioning", Journal of the American Geriatrics Society, vol. 62, No. 5, pp. 850-856, (2014).
Davis, A. et al., "Aging and hearing health: The life-course approach", The Gerontologist, vol. 56, No. 62, S256-S267, (2016).
Dawes, P. et al., "Hearing loss and cognition: The role of hearing aids, social isolation and depression", PLoS ONE, vol. 10, No. 3, e0119616, pp. 1-9, (2015).
Lin, F.R. et al., "Hearing loss and incident dementia", Archives of Neurology, vol. 68, No. 2, pp. 214-220, (2011).
Lin. F.R. et al., "Association of hearing impairment with brain vol. changes in older adults", Neuroimage, vol. 90, pp. 84-92, (2014).
Lin. F.R. et al., "Hearing loss and falls among older adults in the United States", Archives of Internal Medicine, vol. 172, No. 4, pp. 369-371, (2012).
Coverstone, J.A. "Prevalence of hearing difficulty and tinnitus with normal hearing thresholds", Science and Research News, Tinnitus Today Summer 2018, pp. 36-37, found at www.ata.org/sites/default/files/Summer-2018-36.pdf, (2018).
American Tinnitus Association, "Impact of tinnitus", pp. 1-6, found at www.ata.org/understanding-facts/impact-tinnitus, (2022).
Cassoobhoy, A. "What is misophonia?", WebMD, 4 pages, found at www.webmd.com/mental-health/what-is-misophonia, (2020).
Blamey, P. J. "Adaptive dynamic range optimization (ADRO): A digital amplification strategy for hearing aids and cochlear implants", Trends in Amplification, vol. 9, No. 2, pp. 77-98, (2005).
Schuab, A., "Enhancing temporal resolution and sound quality: A novel approach to compression", The Hearing Review, vol. 16, No. 8, pp. 28-33, (2008).
Chung. K. "Challenges and recent developments in hearing aids: Part I speech understanding in noise, microphone technologies and noise reduction algorithms", Trends In Amplification, vol. 8, No. 3, pp. 83-124 (2004).
Lentz, J.J. "Estimating threshold in quiet", Psychoacoustics: Perception of Normal and Impaired Hearing with Audiology Applications, chapter 2, pp. 13-44, (2020).
Lentz, J.J. "Loudness and the perception of intensity", Psychoacoustics: Perception of Normal and Impaired Hearing with Audiology Applications, chapter 4, pp. 79-108, (2020).
Amlani, A.M. "Apps for the ears", The ASHA Leader, vol. 19, No. 34-35, pp. 1-3, (2014).
Valente, M. et al., "The independent hearing aid fitting forum (IHAFF) protocol", Trends in Amplification, vol. 2, No. 1, pp. 6-35, (1997).
Definition of "Pure-tone audiometry" printed from Wikipedia, the free encyclopedia on Feb. 28, 2022 found at http://en.wikipedia.org/wiki/Pure-tone_audiometry.
Definition of "Digital audio" printed from Wikipedia, the free encyclopedia on Apr. 29, 2022 found at http://en.wikipedia.org/wiki/Digital_audio.
Lentz, J.J. "Pitch perception", Psychoacoustics: Perception of Normal and Impaired Hearing with Audiology Applications, chapter 6, pp. 141-172, (2020).
"Turn your smartphone into a fully functional hearing aid with Petralex application!", Petralex, pp. 1-3, found at https://petralex.pro/en/page/press, (2022).
"Phone-based hearing aid Technology", Petralex, pp. 1-3, found at https://petralex.pro/en/page/about, (2022).
Dahlquist, L.H. "Classroom amplification: not just for the hearing impaired anymore", Audio Enhancement, pp. 1-3, found at https://audioenhancement.com/wp-content/uploads/2018/06/Classroom-Amp-Not-Just-for-Hearing-Impaired-Dahlquist-Hubble-1998.pdf, (1998).
Masalski, M. et al., "Hearing tests on mobile devices: Evaluation of the reference sound level by means of biological calibration", Journal of Medical Internet Research, vol. 18, issue 5, e130, pp. 1-12, (2016).

* cited by examiner

Signal Processing App User Interface 100

SYSTEM AND METHOD FOR PERSONALIZED SOUND MODIFICATION

BACKGROUND

Hearing is an important sense for communication and hearing loss is one of the leading causes of years lived with disability worldwide[1]. Children with hearing loss often experience delays in speech, language, cognitive, and psychosocial developments.[2-3] Adults with hearing loss are more likely than their peers with normal hearing to experience social isolation, fatigue, lower income, and lower quality of life[4-5]. Older adults with hearing loss are reported to have higher incidences of brain atrophy, dementia, depression, difficulty walking, falls, frailty, mortality, and generally poorer physical and mental health[6-12]. Sound amplification is a proven intervention to reduce the negative effects of hearing loss for children and adults.

Tinnitus is the perception of sounds in the absence of a physical sound source in the environment. Approximately 10.6% of people with normal hearing reported persistent tinnitus, which is a comorbid condition for 27% of individuals with hearing loss.[13] The negative effects of tinnitus include annoyance, stress, interference with sleep, depression, anxiety, frequency mood swings, irritability/frustration, poor concentration, pain, and suicidal thoughts in severe cases.[14] Typical tinnitus treatments include amplifying sound in the environment to make tinnitus less noticeable, using sounds or music to mask the tinnitus, and utilizing different counseling and adaptation techniques to lessen the negative effects of tinnitus.

Misophonia (also referred to as misophony) is a condition in which a person experiences emotional or physiological distress when hearing a triggering sound(s).[15] Severe responses to the triggering sound(s) might include rage, anger, hatred, panic, fear, and emotional distress. Individuals with misophonia may develop anticipatory anxiety and they may try to avoid certain situations in which the triggering sound(s) might occur. Current treatment for misophonia include avoidance, talk therapy, and sound therapy which offers distractions from the triggering sound.

Current interventions to hearing loss involve the use of dedicated amplification devices, such as POCKETTALKER®, hearing aids (including over-the-counter hearing aids), cochlear implants, and assistive listening devices. Most modern digital hearing aids are programmed by manufacturers' proprietary fitting software based on the softest sound level the users can hear (that is, the user's hearing threshold) at different frequencies (for example, from 250-8000 Hz) when the hearing thresholds were measured using an audiometer. Hearing professionals who fit these hearing aids can adjust different parameters in the hearing aids using the manufacturer's fitting software. The amount of gain provided at different frequencies is one of the most important parameters that hearing professionals adjust to create an individualized listening program for users with hearing loss.

In a hearing aid fitting process, hearing professionals may perform real ear measurements to adjust the gains to the targets recommended by a hearing aid prescription of their choice. The goals of conducting real ear measurements are to take both the anatomical characteristics of the users and the hearing aid characteristics into account and measure the hearing aid output to determine the sound pressure level at the users' ear drums and make sure most speech sounds are within the users' audible range.

Several types of user device apps (such as smartphones apps) have been developed to serve as the interface between users and their sound amplification devices to control the amplification parameters of the sound amplification devices. A first type of app has been developed by hearing aid manufacturers to provide convenient post-hearing aid fitting options for hearing professionals and/or end-users to change the amplification characteristics of the devices to suit the users' listening needs or preferred sound quality in different environments.

A second type of app has been developed to allow end-users to fit over-the-counter hearing aids, which are also dedicated amplification devices similar to professionally dispensed hearing aids. These apps (referred to as self-fitting apps) are used by end-users to program the over-the-counter hearing aids, with or without support from a customer service personnel of hearing aid manufacturer or distributor. These apps may be implemented on user devices (such as smartphones, tablets or desk-top computers). Typically, an end-users can generate individualized listening programs based on (1) audiograms obtained through a hearing professional and entered into the app, or (2) audiograms prepared by the end-user using the app while wearing the over-the-counter hearing aid. Controls within the app user interface (such as a graphical user interface) for different frequencies are usually available to allow the user to adjust the hearing aid gains to suit their individual listening needs in different environments or personal sound quality preferences.

A third type of app is designed to control the settings of devices such as smartphones or tablets and deliver the amplified sounds to users with hearing loss via headphones or earbuds. These amplification apps do not require dedicated amplification devices, but rather take advantage of the processing power and amplification available from the users' devices and earbuds or headphones.

Some of these third type of app are designed to amplify phone calls or internet streaming content so that users can hear the sounds easily using earbuds or headphones. Other apps of this type use the microphones already present in the user's devices, or a connected external microphone, to pick up sounds from the environment, amplify the sounds, and deliver the amplified (and optionally processed) sounds to the users.

Most amplification apps do not require users to input any personal information because the amounts of amplification are adjusted by the users using the overall volume control or the controls specific for different frequencies on the apps. Individualization of these amplification apps has been a challenge due to the diverse technical specifications of the user devices and earbuds or headphones. This is less of a problem with equipment from APPLE® because they have similar technical specifications. An audio app can estimate the sound pressure level delivered to the users' ear canal if an APPLE® smartphone is paired with an APPLE® sound delivering transducer (for example, AIRPODS®).

For devices which use ANDROID® (such as SAMSUNG® smartphones), however, different manufacturers use different specifications to manufacture the devices. Users may also choose to pair the devices from one manufacturer with earbuds or headphones from a different manufacturer or different models. Such mixing and matching of equipment make the sound level outputs very unpredictable. In other words, the apps can only determine the amount of gain provided to the incoming sound signals but cannot determine the sound pressure level output at the users' ear canals or eardrums, which determines how much the users can hear and the benefits of the amplification. While the risk of overamplification is low in self-fitting hearing devices because users can always reduce the volume when the sounds are too loud, the risk of under-amplification can be high because users might not know what sounds they are missing, that is they do not know what they do not hear.

Many apps for users having tinnitus are also created to alleviate the annoyance and negative effects of tinnitus. Most such apps deliver masking sound or music to individuals with tinnitus so that their tinnitus is less annoying or debilitating. These apps also rely on users to adjust the masking sound or music volume and again, automated individualization is limited.

SUMMARY

In a first aspect, the invention is a method for personalized sound modification, with a personal sound system having a microphone; a user device which includes a processor, computer readable medium, and optionally the microphone; and a sound output device; the method comprising: providing a user hearing profile including lower and upper limits of the user's auditory dynamic range at a plurality of sound frequencies, prepared with the personal sound system; receiving a sound signal from the microphone; optionally separating the sound signal into a plurality of frequency channels; amplifying or attenuating sound frequencies in the sound signal which have a volume level outside the lower or upper limits of the user's auditory dynamic range, respectively, and forming a modified sound signal with which the sound output device will produce sounds within the user's auditory dynamic range; and providing the modified sound signal to the sound output device.

In a second aspect, the invention is a computer program product, comprising a computer readable medium having a computer readable program code embodied therein, the computer readable program code adapted to be executed to implement a method for personalized sound modification with a personal sound system, the method comprising: providing a user hearing profile including lower and upper limits of the user's auditory dynamic range at a plurality of sound frequencies, prepared with the personal sound system; receiving a sound signal from the microphone; optionally separating the sound signal into a plurality of frequency channels; amplifying or attenuating sound frequencies in the sound signal which have a volume level outside the lower or upper limits of the user's auditory dynamic range, respectively, and forming a modified sound signal with which the sound output device will produce sounds within the user's auditory dynamic range; and providing the modified sound signal to the sound output device. The personal sound system comprises a microphone; a user device which includes a processor, computer readable medium, and optionally the microphone; and a sound output device.

In a third aspect, the invention is a system for personalized sound modification, comprising: (1) a personal sound system, having (i) a microphone, (ii) a user device which includes a processor, computer readable medium, and optionally the microphone, and (iii) a sound output device, and (2) a computer program product, comprising a computer readable medium having a computer readable program code embodied therein, the computer readable program code adapted to be executed to implement a method for personalized sound modification with the personal sound system, the method comprising: providing a user hearing profile including lower and upper limits of the user's auditory dynamic range at a plurality of sound frequencies, prepared with the personal sound system; receiving a sound signal from the microphone; optionally separating the sound signal into a plurality of frequency channels; amplifying or attenuating sound frequencies in the sound signal which have a volume level outside the lower or upper limits of the user's auditory dynamic range, respectively, and forming a modified sound signal with which the sound output device will produce sounds within the user's auditory dynamic range; and providing the modified sound signal to the sound output device.

In a fourth aspect, the invention is a method for personalized sound modification for user having tinnitus, with a personal sound system having a microphone; a user device which includes a processor, computer readable medium, and optionally the microphone; and a sound output device; the method comprising: testing the user to estimate a tinnitus frequency and a tinnitus loudness level, with the user device; receiving a sound signal from the microphone; providing masking sounds in the sound signal at a level higher than the tinnitus loudness level at the tinnitus frequency, forming a modified sound signal; and providing the modified sound signal to the output device.

In a fifth aspect, the invention is a method for personalized sound modification for user having misophonia, with a personal sound system having a microphone; a user device which includes a processor, computer readable medium, and optionally the microphone; and a sound output device; the method comprising: recording a sound which triggers the user's misophonia; receiving a sound signal from the microphone; modifying the sound signal to mask, alter or eliminate the sound which triggers the user's misophonia, forming a modified sound signal; and providing the modified sound signal to the output device.

Definitions

"App", "apps" and "algorithm" are used interchangeably and refer to software, which includes one or more computer programs designed to operate computing devices, preferably mobile computing devices such as smartphones and tablet computers. The software may reside on the computing device, such as stored in memory in the computing device, and/or may be stored remotely, such as in a remote server accessed by the computing device through the internet, WiFi® wireless connection, cellular network or other wired or wireless connections. Such software are computer program products which are stored on computer readable media.

A "user device" or a "user's device" refers to a smartphone, table or other mobile device which includes a processor, computer readable medium or memory, and is able to be connected with, or includes, one or more microphones, as well as one or more sound output devices such as earbuds or headphones. The connection between to the microphone(s), the sound output devices, and the user device may be wired or wireless.

The lower and upper limits of a user's auditory dynamic range at any specific frequency is defined as the quietest sound the user can hear and the loudest sound the user can hear without loudness discomfort, respectively.

DETAILED DESCRIPTION

Figure 1:
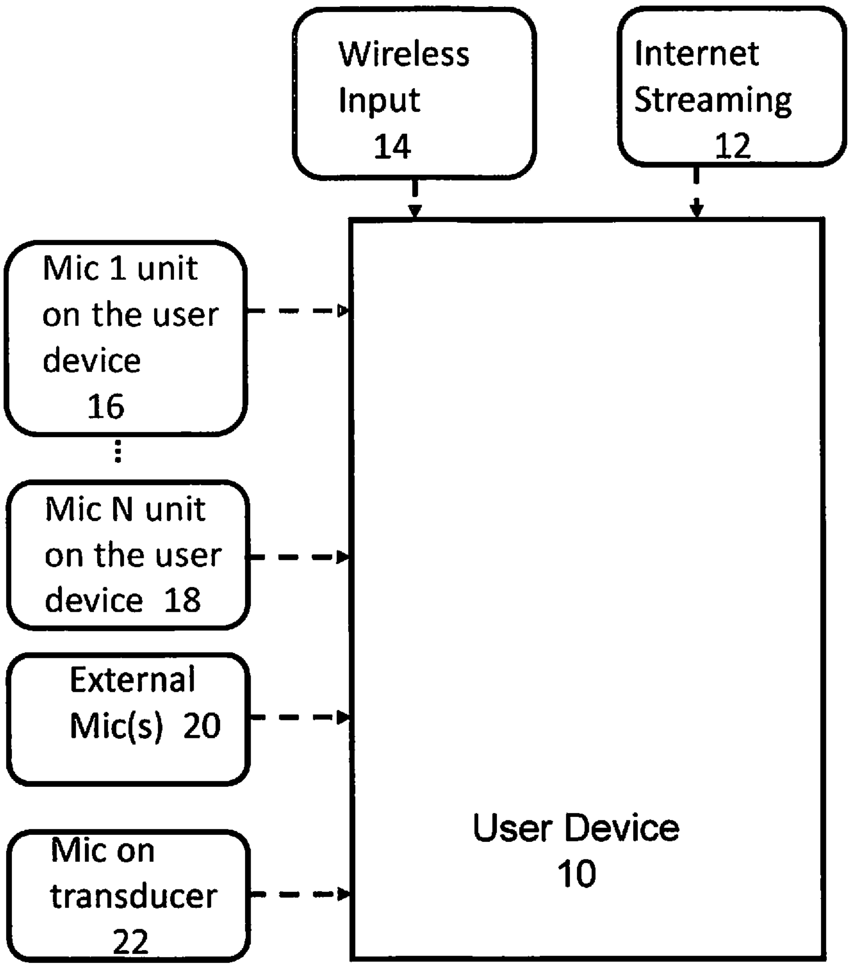
FIG. 1. is a block diagram of a personalized sound modification system with different audio inputs.

The present application includes a versatile system, method and apps for personalized sound modification, which may allow for choosing one or more microphones from a set of available microphones to provide desired output levels to enhance user auditory experience. The systems, methods and apps provide aid for users to address the symptoms and problems associated with hearing loss, tinnitus, and/or misophonia. It allows a user device to select any one or more microphones to pick up sounds from the environment, (2) allows the user devices to process the sound signals to suit the user's individual hearing profile, and (3) provide the sound output from the sound signal to present the processed sounds to be within the individual auditory dynamic range of users with hearing loss, tinnitus, and/or misophonia. All measurements to determine the user's auditory dynamic range may optionally be conducted using one or more apps implemented on the user device and the user's chosen sound output devices. The sound modification systems and methods may be implemented as an app or a series of apps with specific functions within the user device. This avoids the need to purchase dedicated devices, equipment or hearing aids, while providing personalized amplification, tinnitus masking, and/or misophonia relief.

The versatile sound modification systems, methods and apps of the present application resolve a major calibration obstacle encountered with user devices using ANDROID®. The users have the freedom to choose any user device with their choice earbud or headphone. If the users decide to or need to change to different components, they can simply repeat testing procedures in order to customize the systems, methods and apps their individual listening needs. Furthermore, since the systems, methods and apps are appropriate for any brand of user device, they can significantly reduce the costs to access amplification, tinnitus masking, and misophonia relief.

An integrated sound modification system may include one or multiple input sources that pick up sounds from the environment or stream audio signals from other sources; a user device to process the input audio signals; a sound delivering transducer(s) to present the processed audio signals into the user's ear canals (for example, wired or wireless earbuds or headphones) or to the environment that the user is in (for example, loudspeakers) for the purpose of providing a low-cost amplification device, hearing protection device, assistive listening device, tinnitus masking device with audible or amplified audio signals, hearing protection and communication-enabled device, and/or sound cleaning device (for example, for removing sounds eliciting misophony).

The user device is able to simultaneously receive and analyze the microphone outputs from one or more devices, process the microphone outputs based on the user's individual hearing profile by performing different operations, adding, subtracting, amplifying, reducing, or combining them in different ratios, send the resulting signal for further processing, and present a personalized signal to the user via wired or wireless sound delivering transducers. The sound modification may be made without using a dedicated hearing aid, tinnitus masker, or a misophony reducer. The system may automatically choose the audio input source or the audio input source combination based on predetermined criteria to improve speech understanding, reduce background noise, enhance sound quality, and enhance overall user experience. The system may allow the user to choose the audio input source(s). The system may estimate the auditory dynamic ranges of the device user by testing the hearing thresholds, loudness sensations, and loudness discomfort levels at different frequencies while the user is using the user device and wearing the sound delivering transducer. The system may then present audio signals to be within the auditory dynamic ranges of the user to compensate for any hearing loss the user might have.

In a variation, the system may estimate the frequency(ies) and level(s) of user perceived tinnitus, generate masking sounds for the tinnitus with a level slightly higher than the level of the tinnitus at the frequency channel that the tinnitus falls into, adjust the lower limit of the auditory dynamic range at the frequency channel to be higher than the masking sounds, and present audio signals to be within the auditory dynamic range of the user. The system may estimate the frequency(ies) and level(s) of user perceived tinnitus, adjust the lower limit of the auditory dynamic range at the frequency channel to be higher than the level of the tinnitus, and present audio signals within the auditory dynamic range of the user. The system may estimate the frequency(ies) and level(s) of user perceived tinnitus, adjust the lower limit of the auditory dynamic range at the frequency channel to be slightly lower than the level of the tinnitus, and present audio signals within the auditory dynamic range of the user. The system may estimate the frequency(ies) and level(s) of user perceived tinnitus, automatically generate or allocate a frequency channel(s) to process the sounds surrounding each tinnitus (for example, with ⅓ octave bandwidth of each tinnitus frequency), adjust the lower limits of the auditory dynamic range at the frequency channel to be higher than the level of the tinnitus, test the upper limits of the auditory dynamic range at the tinnitus frequency(ies), and present audio signals within the auditory dynamic range of the user. In a one channel system, the system may estimate the frequency(ies) and level(s) of user perceived tinnitus, adjust the lower limits of the auditory dynamic range at the tinnitus frequency(ies) to be higher than the level of the tinnitus, test the upper limits of the auditory dynamic range at the tinnitus frequency(ies), and present audio signals within the auditory dynamic range of the user. The system may learn the spectral, temporal, and intensity characteristics of the triggering sound for misophonia and reduce, omit, and/or alter the characteristics of the trigger sound or generate a masker sound to mask the trigger sound.

FIG. 1. is a block diagram of a personalized sound modification system with different audio inputs. As illustrated, the system includes a user device, 10, optionally connected to one or more microphones built into the user device, 16 and 18, optionally connected to one or more external microphones, 20, and connected to an optional microphone in a sound delivery device, 22, such as in an earbud or headphones. The microphones can be wired or wireless. Optionally, also present are one or more wireless and/or wired input-output interfaces, 12 and 14, which may be connected to other devices. A user device will include a user interface (such as a touch screen with display), memory, a processor, and one or more wireless and/or wired input-output interfaces for connecting to at least one microphone and/or at least one sound delivery device.

Figure 2:
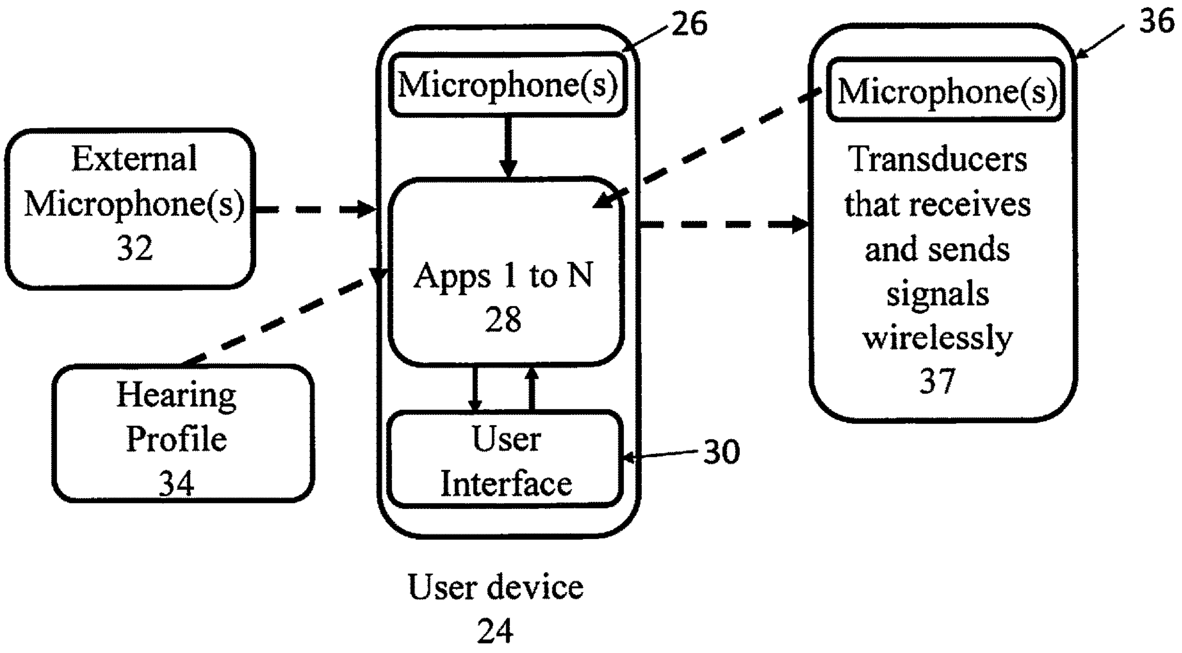
FIG. 2 is a flow chart showing a method and system for personalized sound modification.

FIG. 2 is a flow chart showing a method and system for personalized sound modification including one or more external microphones, 32, an internal microphone, 26, and a microphone, 36, present on the sound delivery device, 37, all of which are connected to the user device, 24, via wired or wireless connections. The internal microphone is internal to the user device. Also illustrated in a user hearing profile, 34, stored in memory on the user device or in a cloud server (not illustrated), which interacts with one or more apps, 28, also stored on the user device. In the method, sound is converted to a sound signal by the one or more external microphones and/or the internal microphone. The sound signal(s) are then processed by the user device and modified by method steps carried out by control of the app(s), to produce a modified sound signal based on the hearing profile. The modified sound signal is then sent to the connected sound delivery device. A user interface, 30, displays information for the user and/or presents controls for the user to modify how the signal is processed, and also allows selection of apps for sound modification.

Figure 3:
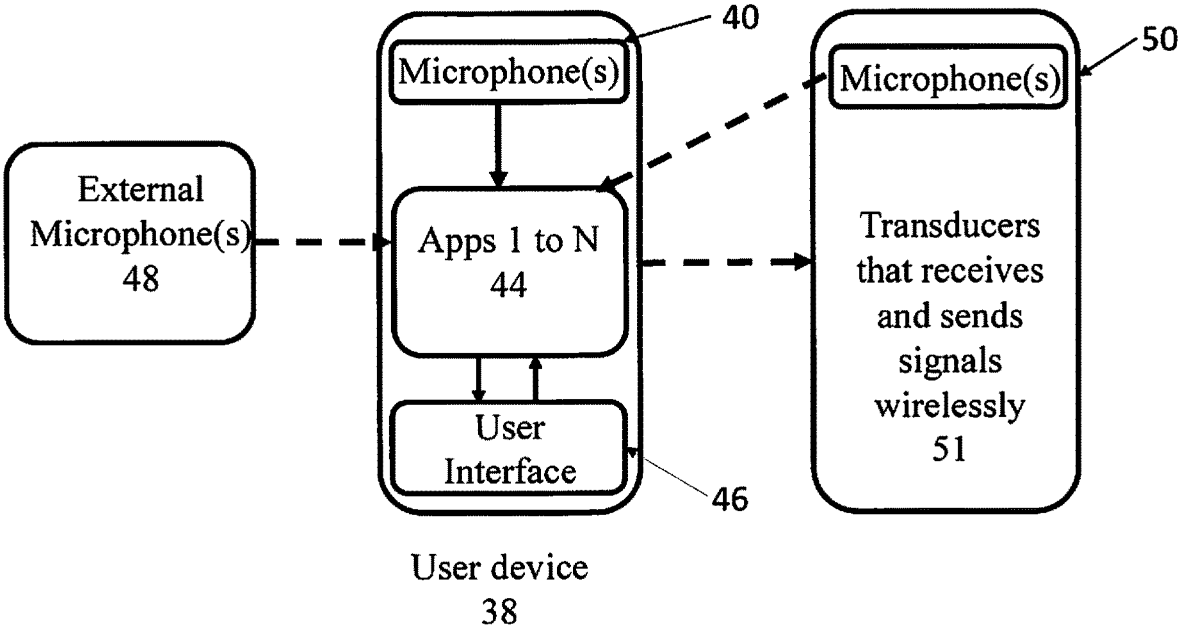
FIG. 3 is a flow chart showing another method and system for personalized sound modification.

FIG. 3 is a flow chart showing another method and system for personalized sound modification including one or more external microphones, 48, an internal microphone, 40, and a microphone, 50, present on the sound delivery device, 51, all of which are connected to the user device, 38. In this method a user hearing profile is generated using one or more apps, 44, and stored in memory on the user device or in a cloud server (not illustrated), which interacts with one or more apps, 44, also stored on the user device. In the method, sound is converted to a sound signal by the one or more external microphones and/or the internal microphone. The sound signal(s) are then processed by the user device and modified by method steps carried out by control of the app(s), to produce a modified sound signal based on the hearing profile. The modified sound signal is then sent to the connected sound delivery device. A user interface, 46, displays information for the user and/or presents controls for the user to modify how the signal is processed, and also allows selection of apps for sound modification.

Figure 4:
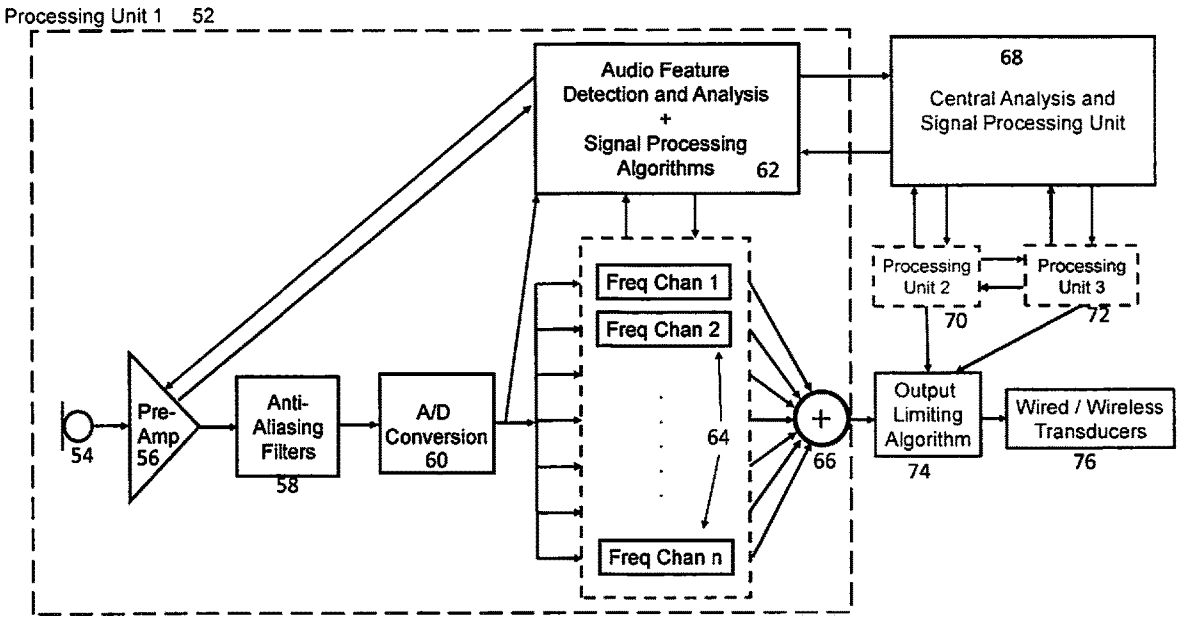
FIG. 4 is flow chart showing details of a personalized sound modification system and method.

FIG. 4 is flow chart showing details of a personalized sound modification system and method. Arrows in the figure indicate the direction of the information flow or sound signals. Within processing unit 1, 52, is included optionally one or more microphones, 54, which is connected to a central analysis and signal processing unit, 68, which receives the audio feature analysis and signal processing information from the microphone(s). Optional processing unit 2, 70, and optional processing unit 3, 72, are similar or the same as processing unit 1, and are also connected to the central analysis and signal processing unit, and if present contain at least one microphone each. The central analysis and signal processing unit uses the sound signals from the various processing units and produces a sound signal which is output after further processing to the sound delivering transducer (that is, the sound delivery device, 76). The arrows pointing to and from processing unit 2 and processing unit 3 indicate exchange of the signals they pick up from the environment and signal processing information between the two input units. Such exchange can exist between and among any of the microphones or processing units. Although illustrated with the central analysis and signal processing unit only connected to the processing units 1, 2 and 3, alternatively the central analysis and signal processing unit may be connected to the output limiting algorithm, 74, directly. Optionally, the processing units may contain circuits and/or software for any one or more of pre-amplification, 56, anti-aliasing filtering, 58, analog-digital conversion, 60, separate frequency channels, 64, summing of the frequency channels, 66, and audio feature detection, analysis, and additional signal processing algorithms, 62. All algorithms and processing may be carried out with software and/or hardware present in the user device. Although illustrated separately, all software may be implemented by a single processor and memory present within the user device.

The processing units in the sound modification system and method are used to pick up sounds in the user's environment or to receive sounds from the internet or other audio sources. In one of the embodiments of the sound modification system, multiple microphones are available to the system, for example microphone(s) on the user device, an external wired/wireless microphone(s), microphone(s) on wired/wireless sound delivering transducer(s) (as illustrated in FIG. 1). The apps in the user device receives audio signal from the microphone inputs and process the audio to be suitable for the listening needs of the user. The output limiting algorithm and/or the central analysis and signal processing unit may include one or more apps which make use of a hearing profile to modify the sound signal from the central analysis and signal processing unit.

The processing units may also have an audio feature analysis and signal processing unit to analyze the spectral, temporal, and intensity characteristics of the signal and use pattern recognition to infer the types of signals that are present in the environment. The audio signals in different processing units may be combined in addition, subtraction or by performing other mathematical operations with the purpose of improving the signal to suit the listening needs of the user (for example, lower noise level, higher speech level, higher speech-to-noise ratio, or better music quality). In one possible arrangement, the audio signals from different processing units are added so that the system can process sounds in the environment as well as sound from an internet source. In another alternative, the audio signals from one processing unit is subtracted from those another processing unit to form a directional microphone that can enhance the system's sensitivity for sounds coming from the front of the user compared to sounds from the back of the user so that the user can hear sounds from the front clearer or with better sound quality. The directional microphone can also have an adaptive polar pattern so that the directional microphone can be more sensitive to desired signals (for example, speech) or signals at the desired directions (for example, right hand side of the user when the user driving a vehicle) than undesired signals (for example, background noise) or signals at undesired directions (for example, background noise from other directions other than the right-hand side). In another alternative, the audio signals from one processing unit with an external microphone held by one communication partner, and those from a second processing unit with a second external microphone held by another communication partner, are added so that the user can hear two or more communication partners better in a noisy environment. In another alternative, the audio signals from one processing unit with a wireless external microphone worn by one communication partner, and those from a second processing unit with a second wireless external microphone worn by another communication partner, are added so that the user can hear two or more communication partners better in a noisy environment.

In one variation, the user device receives signals from multiple microphones and the audio feature detection and analysis and signal processing unit in each processing unit may automatically (1) analyze the spectral, temporal, and intensity of the incoming signal, (2) identify the types of input using pattern recognition or machine learning, (3) send the results of the analysis to the central analysis and signal processing unit, which receives the results of the analyses from multiple input units and chooses the most desired microphone output (for example, lowest background noise level, highest speech level, highest signal-to-noise ratio, music, etc.) to be further processed. The chosen input then is (1) processed in the central analysis and signal processing unit and/or in the audio feature detection analysis and signal processing unit taking the information in the user's hearing profile into consideration, (2) processed based on the signal characteristics, user's hearing profile, and knowledge in the audiology, hearing sciences, signal processing, and engineering fields, (3) sent to an output limiting algorithm to ensure the output of the sound modification system which ensures the process audio signals do not exceed the maximum power output of the sound delivering transducer nor the loudness discomfort level of the user, and then (4) fed to the sound delivering devices and the user's ears.

In another variation, the user chooses which input device to listen to or to use to pick up sound from the environment, and the central analysis and signal processing unit and/or in the audio feature detection and analysis and signal processing unit process the audio signals from the choice input device, processes the audio signals from the chosen input device based on the information in the user's hearing profile, and then sends the processed audio signals to the sound delivering transducers.

In another variation the central analysis and signal processing unit and/or in the audio feature detection and analysis and signal processing unit automatically chooses the audio signals from one or more input device based on a set of predetermined criteria in the user's hearing profile, processes the audio signals based on the information in the user's hearing profile, and then sends the processed audio signals to the sound delivering transducers.

The processing of the audio signals can be provided by the audio feature detection and analysis and signal processing unit, the central analysis and signal processing unit, or a combination of the two, or and the functions of the unit can be a part of other apps (for example, the amplification app, the tinnitus intervention app, or the misophonia relief app).

Figure 5:
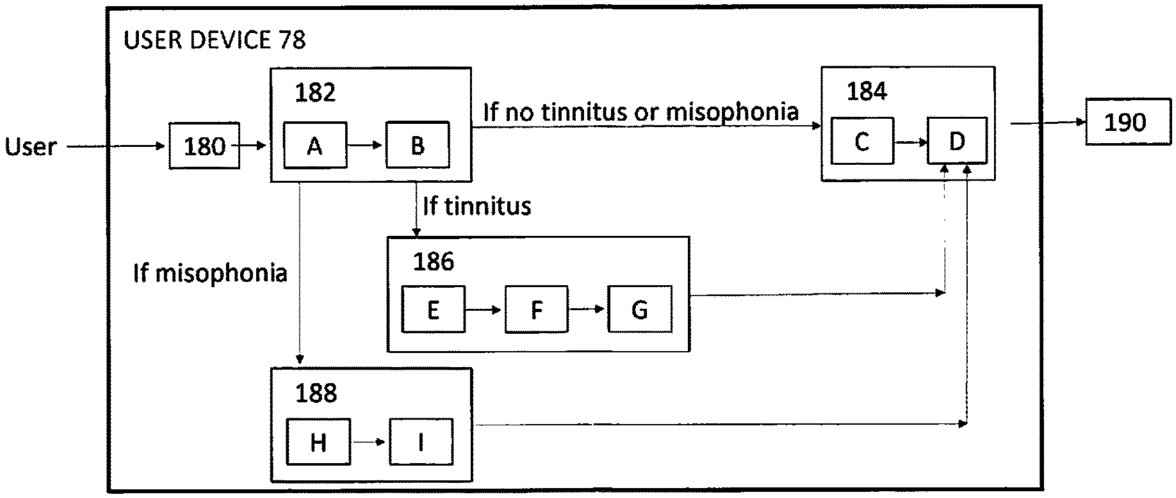
FIG. 5 is a flow chart showing a system, methods and apps for personalized sound modification.

FIG. 5 is a flow chart showing a system, methods and apps for personalized sound modification. Illustrated in the figure are a user device, 78, which includes several apps including a hearing profile app, 180, to input or collect basic demographic information of the user, information about the presence and characteristics of a user's tinnitus and/or misophony, information about the type of user device, type and number of external microphones used by the user, and the type of sound output device (such as earbuds, headphone, and their noise cancelling capabilities). Also illustrated is a dynamic range app (or hearing test app), 182, which may be used to prepare a hearing profile of the user by carrying out a hearing threshold test, A, using the user device and transducers (for example, using the Hughson-Westlake procedures), and a loudness discomfort level estimation, B (for example, using IHAFF procedures).

The hearing profile app or apps provide as graphical user interface which allows a user to upload or input information into the app(s), and create and/or store user hearing profiles. The hearing profile app or apps also allows other apps on the user device to access the stored information including the hearing profile to guide signal processing priority and device use. The hearing profile app contains information such as demographic information, hearing-related information (for example, hearing thresholds, loudness discomfort levels, tinnitus frequency(ies) and level(s), characteristics of triggering sound(s) for misophonia), user needs (for example, amplification, tinnitus intervention, misophony relief), user choices (for example, choice of signal picked up by the external microphone for further processing in a noisy environment, or choice of directional microphone mode when talking to a conversational partner), and user preferences (for example, preferred sounds for tinnitus intervention, trigger sounds for misophonia). The hearing profile app(s) allows the user to change or adjust the information based on user preferences (for example, characteristics of the stored information) and listening environments (for example, speech in a restaurant, or music in a concert hall). Alternatively, all or part of the hearing profile is received from another device and then stored in one of the apps implemented in the user device. In another alternative, the user enters all or part of the information into the hearing profile. In another alternative, the hearing profile is created by using one or a series of apps (for example, a dynamic range app, a tinnitus estimation app, and a sound learning app) which test the user's hearing characteristics using standardized or modified testing procedures based on principles commonly used in the practice of audiology or studies in hearing sciences. Some examples of such procedures include the pure tone audiometry to estimate the hearing thresholds at different frequencies, the IHAFF procedures to estimate the loudness sensations of the user from soft to loudness discomfort levels at different frequencies, frequency matching of tinnitus frequency(ies), and loudness matching of perceived tinnitus loudness level(s). All procedures are conducted using the user device while the user is wearing the sound delivering transducer of choice. The voltages, frequencies, and characteristics of the results are recorded and stored in the app so that other apps in the user device can retrieve such information, create a personalized signal processing profile(s), and process audio signals to suit the user's listening needs in different environments. The Hearing Profile app also stores user preference and signal processing profiles in different environments as environment-dependent listening programs (for example, a listening program for quite environments, a listening program for noisy restaurants, a listening program for music).

As shown in FIG. 5, if the user does not have tinnitus or misophonia, then an amplification app, 184, will optionally carry out a microphone switching algorithm, C, in order to choose the most desirable microphone (or signals from multiple microphones) given the environment, setting, or number of speakers interacting with the user. This app will provide the user an opportunity to provide environment, setting, or number of speakers interacting with the user, as well as the number and/or location of external microphones, such as lapel microphones being worn by conversational partners. The microphone switching algorithm may also select the microphone with the lowest background noise levels or the highest speech-to-noise ratio. The methods to identify background noise and speech signals are described in, for example, ref. 17. The amplification app also includes the sound processing algorithm, D, which accepts all the sound signals which will be provided to the user, and amplifies and/or attenuates the volume of the sound, depending on the frequency, in accordance with the user's hearing profile. The amplification app then provides the modified sound signal to the sound output devices, 190. The amplification app may also processes the sound signal based on the listening program chosen by the user or automatically detected by the audio feature detection and analysis unit and/or the central analysis and signal processing unit.

In case of hearing loss, the sound modification system tests the user's hearing thresholds and their loudness sensations at different output levels to define their loudness growth function and/or their upper limits of hearing (that is, loudness discomfort levels). The auditory dynamic range of a user is frequency-specific as well as mobile-device- and sound-delivering-device-specific. The app then processes the sounds in the environment and present the processed sounds to be within the auditory dynamic range of the individual user so that low-level sounds are audible, medium sounds are comfortable, and high-level sounds are not uncomfortable.

As shown in FIG. 5, if the user does have tinnitus, then the tinnitus app, 186, will optionally estimate the frequency of the user's tinnitus, with a tinnitus frequency estimation app, E, by testing the user using a frequency matching procedure, and optionally estimate the level (or perceived sound volume) of the user's tinnitus by testing the user with a loudness matching procedure, F. The tinnitus app will then be capable of reducing the effects of the user's tinnitus with a tinnitus intervention app, G, by for example, masking the tinnitus by generation of tones with a frequency surrounding the tinnitus sounds, and/or adjust the users hearing profile to increase the lower limit above the loudness of the user's tinnitus at the frequency of, or the frequencies surrounding, the user's tinnitus frequency.

As shown in FIG. 5, if the user does have misophonia, then the misophony app, 188, will optionally identify the user's triggering sound or sounds using the sound learning app, H, by for example, recording the triggering sound(s) when identified in the ambient sound by the user activation of a virtual button on the user interface or by allowing the user to input the trigger sound(s), and then learn the characteristics of the trigger sound(s). The misophony app will then be able capable of relieve the effects of the triggering sound on the user with the misophonia relieve app, I, by altering the spectral, temporal, and/or intensity characteristics of the trigger sound(s) and/or by generating another sound or a noise to mask the triggering sound.

Figure 6:
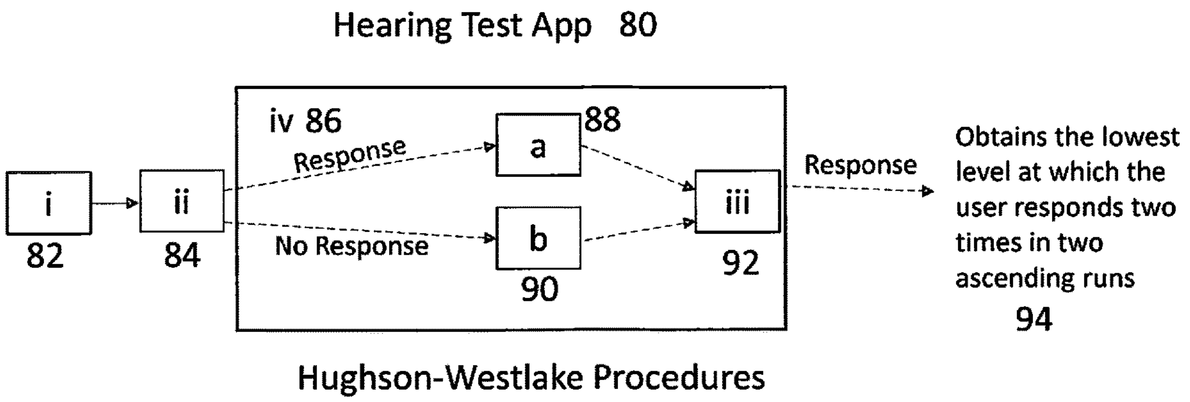
FIG. 6 is a flow chart of an example of a hearing test app or dynamic range app.

FIG. 6 is a flow chart of an example of a hearing test app or dynamic range app, 80, using the Hughson-Westlake Procedures. Optionally, the hearing test app may be used to define the user's auditory dynamic range by testing the user's hearing thresholds and uncomfortable listening levels (or loudness discomfort levels) at different frequencies while the user administers the tests using the user devices and wearing the sound delivering transducer. The signal output of the user device going to the sound delivering transducer at different frequencies are noted and they mark the lower and upper boundaries of the user's auditory dynamic range, respectively.

Hearing thresholds can be tested in many different ways, for example method of limits, method of adjustment, method of constant stimuli, x-alternative forced choice (where x=the number of choices), and the Hughson-Westlake procedures[18]. As shown in FIG. 6, the Hughson-Westlake Procedures may be used by the hearing testing app. As shown (i) the app presents a sound at a first frequency at a first level to the user by sending a sound signal to the sound delivery device when the user is wearing the sound delivery device, 82. Then (ii) the user responds if the sound the user hears a sound, or does not respond if the user does not hear the sound, 84. If the user responds (a) then the app decreases the level of the signal by 10 dB to begin a descending run, 88, or if the user does not respond (b) then the app increases the level of the signal by 5 dB to begin an ascending run, 90, and (iii) the app presents the new increased or decreased sound to the user, 92. Then (iv) steps (ii) and (iii) are repeated to continue the descending run or ascending run until the app finds the lowest level that the use responds 2 times in two ascending runs, 86. Then steps (i)-(iv) (82, 84, 86, 88, 90 and 92) are repeated at another frequency until the hearing testing is completed, 94.

An alternative testing procedure is the three-alternative forced choice procedures. This procedure has the following steps: (i) the user interface has touch screen. (ii) The app shows two geometric shapes and a "No Sound" button. (iii) Each shape flashes 3 times and only one shape flashes with a pulsed signal. (iv) The User responds: (a) Taps the shape associated with the signal (that is, correct response)—the app then decreases the level of the signal by 10 dB; (b) Taps the shape that was not associated with the signal (that is, incorrect response)—the app increases the level of the signal by 5 dB; or (c) Taps the "No Sound" button (that is, the user indicates they cannot hear any sound)—the app increases the level of the signal by 5 dB. Next, (v) the app presents the new signal, and (vi) repeat steps (ii) and (iii) until the app finds the lowest level that the user responses twice. Then the app repeat steps (i)-(vi) at another frequency.

A user's whole auditory dynamic range can be estimated using different methods. For example, randomly present sounds at different volume levels may be presented to the user, who then responds by indicating the perceived loudness using a numeric scale, such 0 (can't hear), 1 (barely audible), 5 (comfortable), to 10 (too loud).

Figure 7:
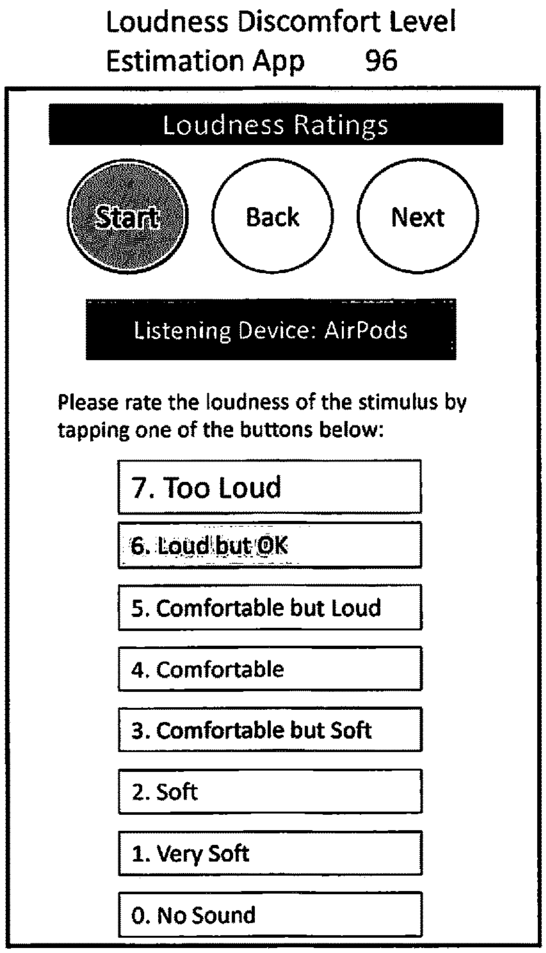
FIG. 7 illustrates a graphical user interface (GUI) for carrying out a test to determine a user's loudness discomfort level and/or hearing threshold.

FIG. 7 illustrates a graphical user interface (GUI), 96, for carrying a test to determine a user's loudness discomfort level and/or hearing threshold. Using the same GUI, modified IHAFF procedures may be used. These procedures can combine the functions of A (Hearing threshold app) and B (Loudness Discomfort Level Estimation App), thus combining A and B shown in FIG. 5. The modified IHAFF procedures may include the following steps: (i) The user uses the user device to administer the app while wearing the sound delivering devices. (ii) The app presents a tone or a narrowband noise at a low voltage level (that is, a low sound level). (iii) The user responds with the perceived loudness level by tapping one of the loudness buttons on the GUI indicating the perceived loudness. (iv) The app presents a level that is 10 dB higher. (v) The user taps one of the loudness buttons indicating the perceived loudness. (vi) Steps (iv) and (v) are repeated until the user indicates that the sound volume is too loud (no. 7). (vii) The app presents the tone or the narrowband noise at 5 dB lower the loudness indicated as too loud. (viii) The user taps one of the loudness buttons indicating the perceived loudness. (ix) The app presents the tone or the narrow band noise 5 dB lower. (x) The user taps one of the loudness buttons indicating the perceived loudness. (xi) Steps (ix) and (x) are repeated until the user taps "No Sound" (no. 0). (xii) The app presents the tone or the narrowband noise at 5 dB above the "No Sound" level. (xiii) The user taps the one of the loudness buttons indicating the perceived loudness. (xiv) The app presents the tone or the narrow band noise 5 dB higher. (xv) The user taps the one of the loudness buttons indicating the perceived loudness. (xvi) Steps (xiv) and (xv) are repeated until the user indicates that the sound volume is too loud (no. 7). (xvii) Steps (i)-(xvi) are repeated at another frequency. The user's auditory dynamic range (that is, the user's hearing profile) is defined as the voltage levels of the user device to generate 1 and 7 at each frequency tested. Another alternative is for the app to concentrate on sound volumes near those indicated as no. 1 and no. 0 and to concentrate on sound volumes near those indicated as no. 6 and no. 7 to find the user's auditory dynamic range.

If desirable, the app may also allow the user to use the same user device but paired with other sound delivery transducers. In such case, the listening device button shown on FIG. 7 may be expanded to display the names of different transducer types. The user can choose with which transducer to conduct all the tests in the sound modification system including the hearing profile, hearing tests, auditory dynamic range, loudness ratings, tinnitus frequency and level estimations, and misophony tests. All the test results are transducer-dependent (that is, sound output device-dependent) and they cannot be interchanged with a different model or make of another transducer type.

The app may test the user at multiple frequencies, preferably at least 4 frequencies included 4 to 10 or even more frequencies. The frequencies should all be within the limits of human hearing, from 20 Hz to 20,000 Hz, more preferably 100 Hz to 10,000 Hz, for example in the range of typical speech and ambient sounds such as 250 Hz to 6000 Hz. For example, initial testing frequencies may be 500 Hz, 1000 Hz, 2000 Hz and 4000 Hz. Preferably, if the difference between the hearing thresholds of two adjacent tested frequencies are greater than 20 dB, then a frequency which is between the two adjacent tested frequencies should be added to the test frequencies.

The app then produces a user's hearing profile, which includes the hearing threshold and loudness discomfort level for each frequency tested. For frequency values between frequencies tested, the hearing threshold and loudness discomfort level are interpolated. Similarly, for frequencies below and above the lowest and highest frequencies tested, respectively, it is assumed that the hearing threshold and loudness discomfort level is the same as the nearest frequency tested (i.e., the auditory dynamic range is extrapolated).

Figure 8:
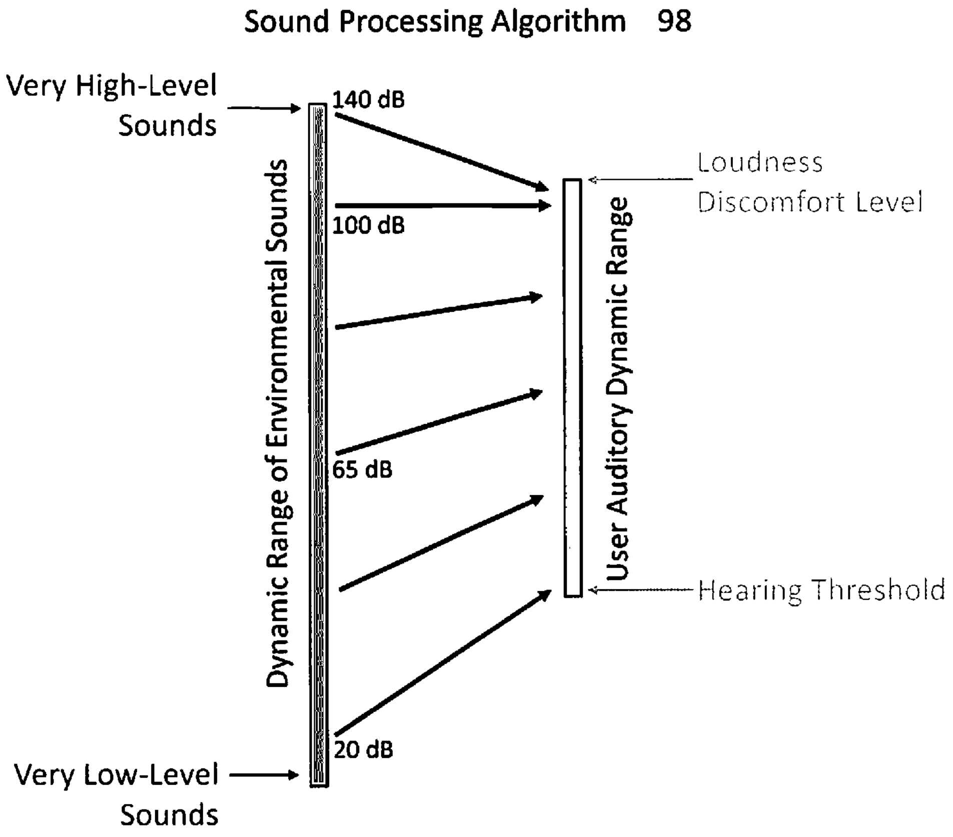
FIG. 8 illustrates the amount of amplification or attenuation in an example where the dynamic range of environmental sounds is from 20 dB to 140 dB.
Figure 9A:
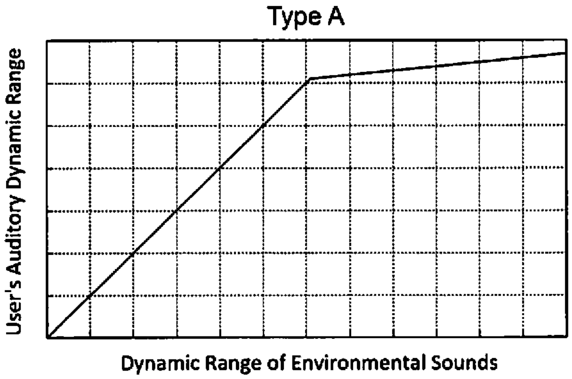
FIG. 9A, FIG. 9B, FIG. 9C, FIG. 9D, FIG. 9E, and FIG. 9F illustrate curves which may be used to determine the amount of amplification or attenuation of environmental sounds.
Figure 9B:
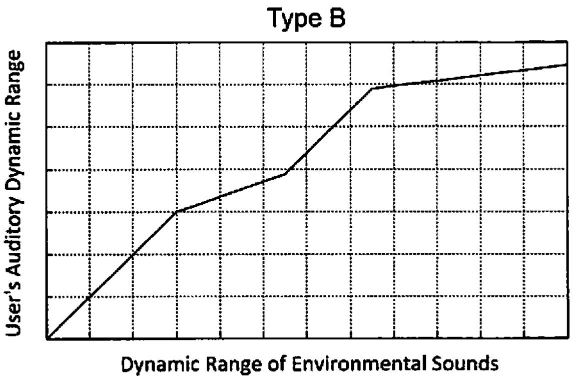
Figure 9C:
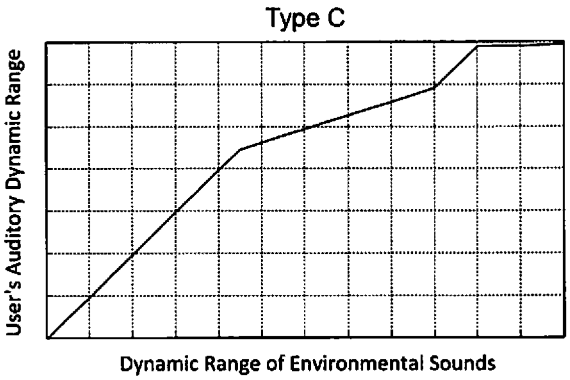
Figure 9D:
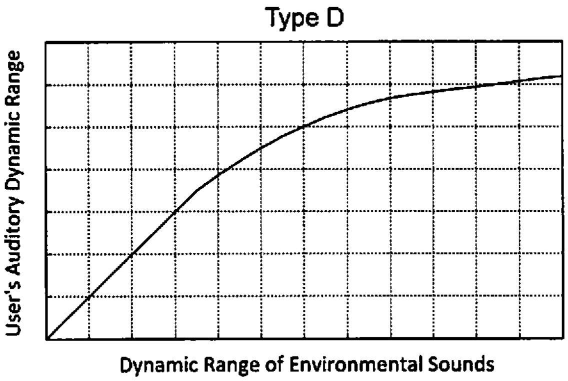
Figure 9E:
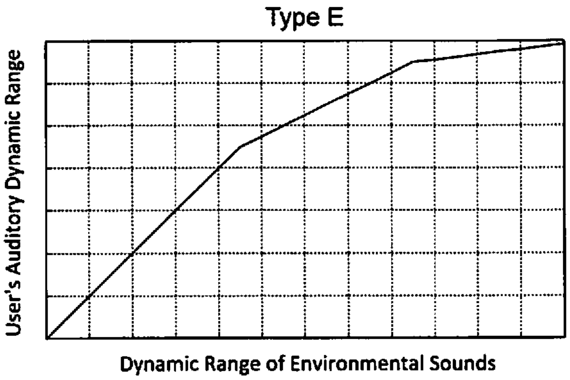
Figure 9F:
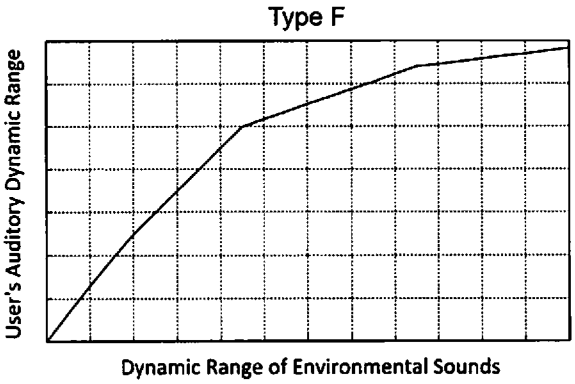

The amplification app or apps, which can be an independent app or a part of other app(s) implemented in the user device, amplifies or attenuates sound signals and present the sounds to be within the auditory dynamic range of the user. FIG. 8 illustrates the amount of amplification or attenuation in an example where the dynamic range of environmental sounds is from 20 dB to 140 dB, and a sample user auditory dynamic range, and can be used as a guide for amplification and attenuation by comparison for other dynamic ranges of environmental sounds. Note that the user's auditory dynamic range at various frequencies always include the hearing thresholds and the loudness discomfort levels. The loudness needed to generate the hearing thresholds are lower for users with normal hearing than users with hearing loss (that is, the user's hearing sensitivity information is captured in the measured auditory dynamic ranges and/or the user's hearing profile).

FIG. 9A, FIG. 9B, FIG. 9C, FIG. 9D, FIG. 9E, and FIG. 9F illustrate curves which may be used to determine the amount of amplification or attenuation of environmental sounds. By measuring the dynamic range of the ambient sound and using it to scale the horizontal axis, and using the users auditory dynamic ranges as measure or entered into the user's hearing profile, amplification or attenuation may be calculated. Alternatively, the dynamic range of the ambient sound may be chosen as 20 dB to 100 dB, 120 dB or even 130 dB. The various figures provide alternative schemes for amplification and attenuation. The execution times associated these schemes can be fixed, variable, or adaptive, depending on the user and signal processing profiles.

Other amplification schemes can also be used by the amplification app(s) to provide amplification to the user, for example, Adaptive Dynamic Range Optimization (ADRO) [15], channel-free amplification[16].

Figure 10:
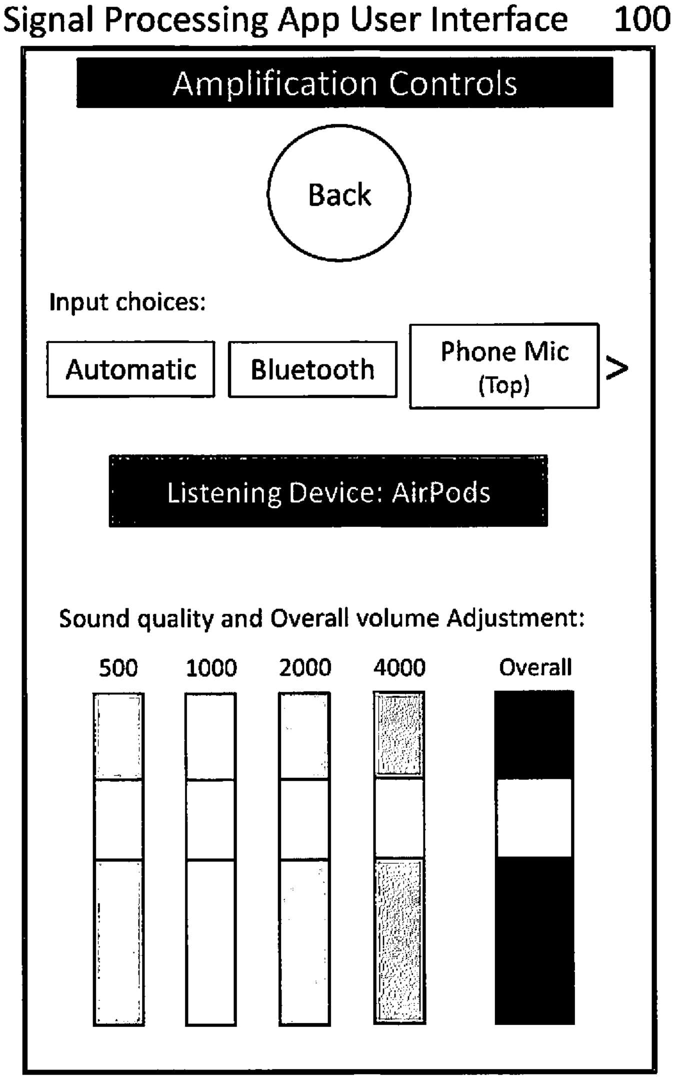
FIG. 10 illustrates a GUI for an amplification app.

FIG. 10 illustrates a GUI for an amplification app, 100. The GUI provides sliding bars so that users can adjust the overall volume control and the amount of gain at different frequencies so that they can further individualize their hearing profiles and the signal processing of the audio signal. The amplification app may have two parts: a microphone selection algorithm, and a signal processing algorithm. For example, the GUI allows the user to control which microphone is used, adjust the outputs at different frequency channels, and adjust the overall output level to suit their individual needs and different listening environments. Alternatively, the user may choose to have the app select, for example, which microphone to use, how much amplification to provide at different frequencies, and which listening program to use. In the GUI, the field labelled "Listening Device:" may displays the user's entry when they indicated which sound delivery device they used in the hearing profile app.

The choice of which microphone or input for the audio signal to be processed and delivered to the user's ears can be (1) indicated by the user in the hearing profile app when the user is in a particular listening situation, or (2) automatically chosen by the central analysis and signal processing unit based on a predetermined criteria defined in the hearing profile app, for example: choose the input audio signal with the lowest background noise level, the highest speech level, the highest signal-to-noise ratio, adopt the directional microphone mode to reduce background noise, etc.

The dynamic range app estimates the hearing thresholds and the loudness discomfort levels at all octave and/or inter-octave frequencies in the speech range (for example from 250 to 8000 Hz), to produce a user's hearing profile. The amplification app then derives the auditory range at each frequency, provides different amounts of amplification or attenuation for low-level, mid-level, and high-level sounds so that all sounds fit into the auditory dynamic ranges at corresponding frequencies of the user, for example using ADRO, channel-free amplification, or the curves in FIG. 9A through FIG. 9F. The processing goals for users with hearing loss are to present sounds above the hearing thresholds and below the device user's loudness discomfort level across audible frequency range, that is the desired sounds will be presented within the device user's individual auditory dynamic range across frequencies.

Alternatively, the dynamic range app estimates the hearing thresholds and the loudness discomfort levels at several frequencies in the speech range (for example, from 250 to 8000 Hz). The amplification app then interpolates or extrapolates the hearing thresholds or the loudness discomfort levels, derives the auditory range at each frequency, and provides different amounts of amplification or attenuation for low-level, mid-level, and high-level sounds so that all sounds fit into the auditory dynamic ranges at corresponding frequencies of the user.

In case the hearing threshold(s) is/are not obtainable at one or multiple frequencies because of user error or high-degree of hearing loss, the auditory dynamic range is assumed to be 0 dB. The user will be advised to check the connections between the components of the sound modification system or to use another device-transducer combination. In case the loudness discomfort levels of the device user cannot be obtained using the device-transducer combination, the dynamic range app may check the user's loudness ratings obtained at the highest sound pressure output levels of the user device. If the highest rating is 3 (comfortable but soft) or lower, a message may pop up to warn the user that the device-transducer combination cannot sufficiently provide needed amplification. If the highest loudness rating is 4 (comfortable) to 6 (loud but ok), the upper limit of the device user's auditory dynamic range will be assumed to be the highest sound pressure output levels (which may also be called as the maximum power outputs) of the device-transducer combination.

In case of tinnitus, the sound modification system has one or more app(s) to tests the frequency and intensity of the tinnitus using procedures similar to those used in standard audiology clinics (for example, loudness matching and pitch matching in a paired comparison paradigm). The system generates narrowband noise surrounding the frequency(ies) of the tinnitus and presents the narrowband noise at levels slightly above the measured levels of tinnitus. The system allows the users to adjust the bandwidth(s), frequency tilt (for example, white noise, pink noise, brown noise), or the levels of the masking noise(s). It also allows superposition of the masker noise with other sounds streamed from phone calls, from the internet, or from the environment. It can alter the spectral, temporal, or intensity characteristics of these sounds to be above the levels of the perceived tinnitus at the tinnitus frequency(ices) to mask the tinnitus.

Figure 11:
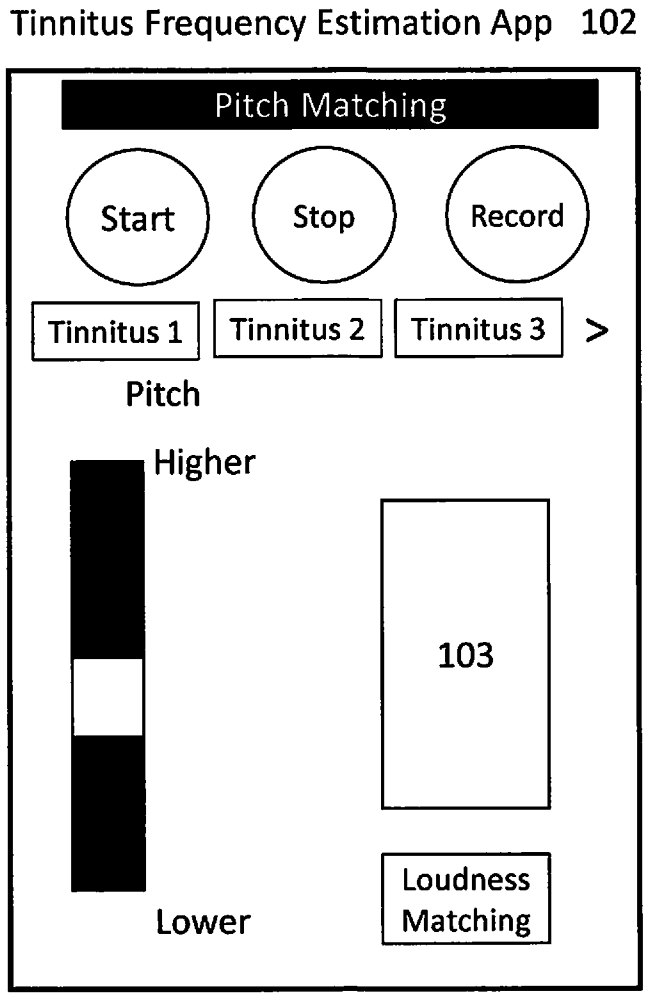
FIG. 11 illustrates a GUI for a tinnitus frequency estimation app.

One or a set of apps, tinnitus estimation apps, which can be an independent or a part of other app(s) implemented in the user device, test the frequency(ies) and volume level(s) of the user's perceived tinnitus, whether it is objective or subjective tinnitus. The frequency and level of sounds are generally perceived as pitch and loudness by the user. There are many different ways to match the pitch and loudness of sounds.[19] FIG. 11 illustrates a GUI for a tinnitus frequency estimation app, 102, with instruction provided within the GUI at 103. The frequency and level of the user's tinnitus can be estimated separately or with the same GUI. The app may provide an option for the user to enter the tinnitus frequency if the user has tested and confirmed the tinnitus frequency by a hearing professional. Then the user can skip the tinnitus frequency estimation app and go directly to the tinnitus level estimation app.

The app, through the GUI, presents a "start" button, a "stop" button, and 1 or 2 sliding buttons, for pitch control and/or level control. In a method of estimating the pitch of the user's tinnitus: (i) When the user presses "Start", the app is ready to presents a signal at a level that is 10 dB above the hearing threshold at a frequency, for example 1000 Hz. (ii) The user may touch the control in the pitch slider to present the signal, which stays on as long as the user's finger is on the button. (iii) The user may then adjust the control by sliding the white box up to increase the frequency of the signal and slide the white box down to decrease the frequency of the signal. The presentation level of the signal is always ~10 dB above the hearing thresholds measured in the signal frequency or ~10 dB above the interpolated or extrapolated hearing threshold at the signal frequency. (iv) The user slides the white box until the pitch of the signal is the same as their tinnitus. (v) Then the user may tap "Record" to record the frequency of their tinnitus. (vi) Then a box is displayed up to ask the user "Do you hear more than one tinnitus sounds?" with "yes" and "no" buttons on the GUI. (vii) If the user responds by touching "yes," "Tinnitus 2" will change color and instructions will display "Please ignore the tinnitus sound that you just matched and match the pitch of the second tinnitus sound." (viii) Then the user can start the pitch matching process for the second tinnitus sound, repeating (i)-(vi). (ix) If the user touches the "Stop" button, and tinnitus frequency estimation is completed. Instruction may be display on the GUI, stating "1. Press the white box to present a sound. 2. Release the white box to stop the sound. 3. Slide the white box up or down till the sound has the same pitch as your tinnitus. 4. Tap "Record" to go to the next screen. 5. Tap "More" if you hear more than one tinnitus sounds. 6. Tap "Stop" to exit."

Additionally, the app(s) may contain an "octave checker" which may present sound signals at the pitch-matched frequency (say, f Hz), one octave lower (that is, f/2 Hz), one octave higher (that is, 2f Hz) to check whether the user is confused with frequencies that are octaves apart. The user will tap "Record" after the app confirms the tinnitus frequency.

If the user tap "Loudness Matching," "Stop," or a white "Tinnitus" button before tapping "Record" to save the frequency of the tinnitus they just matched, a box pops up to ask if the user wants to save the tinnitus pitch. If the user says "yes" the frequency is saved. If the user says "no", no frequency is saved.

Figure 12:
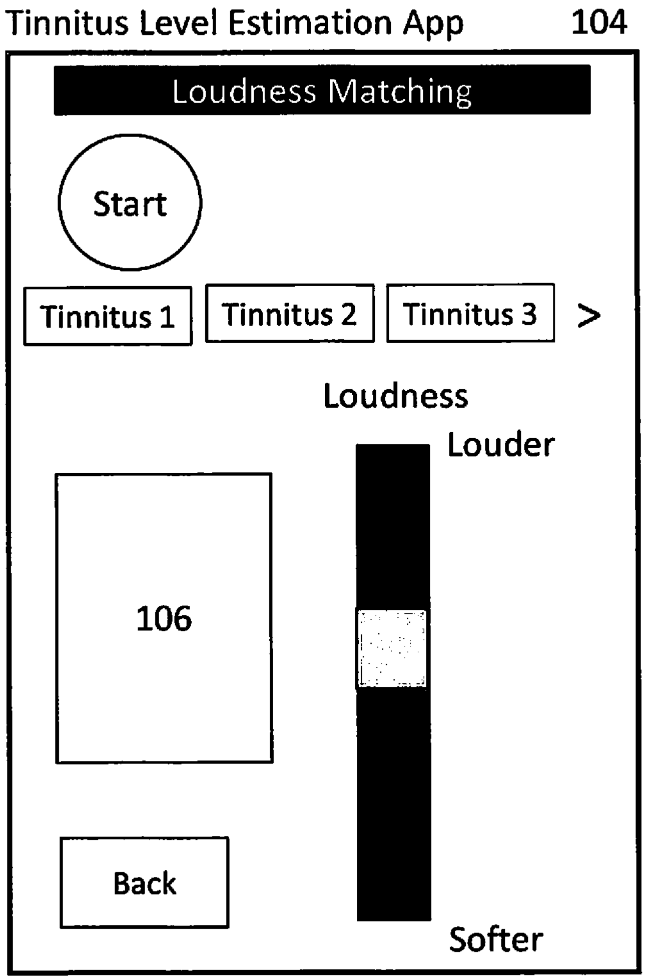
FIG. 12 illustrates a GUI for a tinnitus level estimation app.
Figure 13:
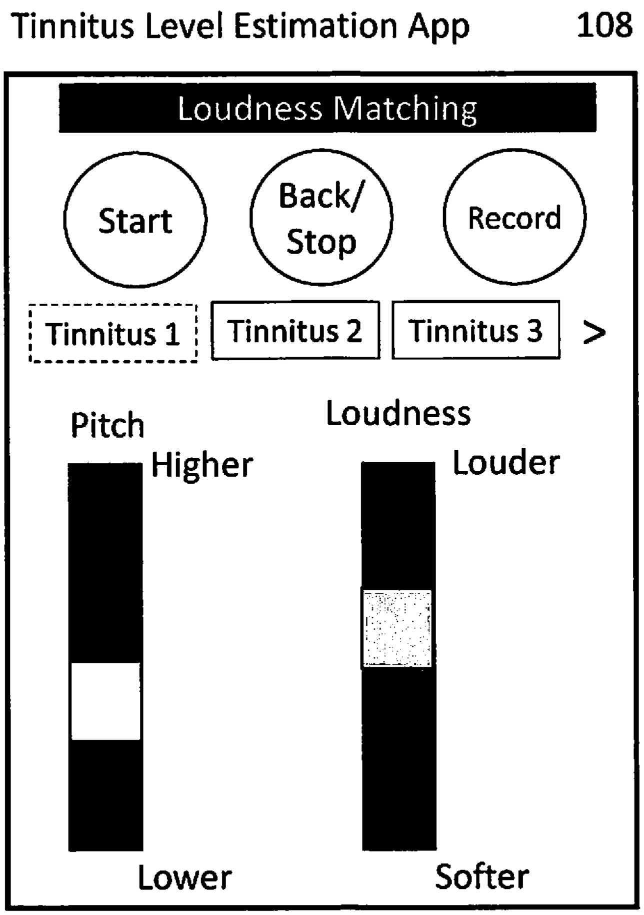
FIG. 13 illustrates a GUI for a combined tinnitus level estimation app and tinnitus frequency estimation app.

FIG. 12 illustrates a GUI for a tinnitus level estimation app, 104, for estimating the loudness level of the user's tinnitus, with instruction at 106. FIG. 13 illustrates a GUI for a tinnitus level estimation app, 108, for estimating both pitch and loudness level of the user's tinnitus. The app, through the GUI, presents a "start" button, a "back" button, and 1 or 2 sliding buttons, for pitch control and/or level control. In a method of estimating loudness level of the user's tinnitus: (i) When the user presses "start", the dash line of Tinnitus 1 moves to show it is the tinnitus sound that the user is working on. (ii) The user can slide the gray box to increase the loudness of the tinnitus. (iii) If the user taps any of the top buttons, the app asks if the user wants to "save" the results. "yes" saves, "no" discards the results. (iv) If the user presses "record", Tinnitus 2 box will have a moving dash line rim to signal it is the tinnitus sound that the user is working on now. (v) "Back/stop" takes the user back. (vi) ">" allows the user more options if the user hears more than 3 tinnitus sounds. (vii) After the user works on all the tinnitus sound (that is, both Tinnitus 1 and Tinnitus 2), if the user taps "record," the app takes the user to the amplification app. (viii) The user can tap on any of the Tinnitus buttons to work on any tinnitus sound.

Instruction may be display on the GUI, stating "1. Slide the gray box up or down till the sound has the same loudness as your tinnitus. 2. If the pitch changed, slide the white box on the pitch bar to match the pitch. Otherwise, only slide the gray bar to match the loudness. 3. Tap the "Start" button to start loudness matching."

For users with tinnitus and/or hearing loss, their auditory dynamic range are tested using the dynamic range app and the frequency(ies) and level(s) of their perceived tinnitus are tested using the tinnitus estimation app. The tinnitus intervention app may generate masking sounds and present it at a level slightly higher than the tinnitus level (for example, 5 or 10 dB higher than the tinnitus levels). The masking sounds generated can be tones, narrowband noises, or wideband noises. The user will be able to adjust the levels, bandwidths, or the temporal characteristics of the masking sounds. In addition, the test results of the tinnitus frequency and level app(s) can be used to increase the lower limits of the user's auditory dynamic range to be above the measured hearing threshold, slightly above the tinnitus level, or slightly above the tinnitus masker level (for example, 5 dB higher than the estimated tinnitus level). The amplification app can amplify environmental sounds, stream sounds from the internet or other input sources to be within the newly-defined auditory dynamic range at the estimated tinnitus frequency and it automatically varies the gains applied to the audio signals so that these sounds are above the estimated tinnitus level and serve as a tinnitus masker.

Figure 14:
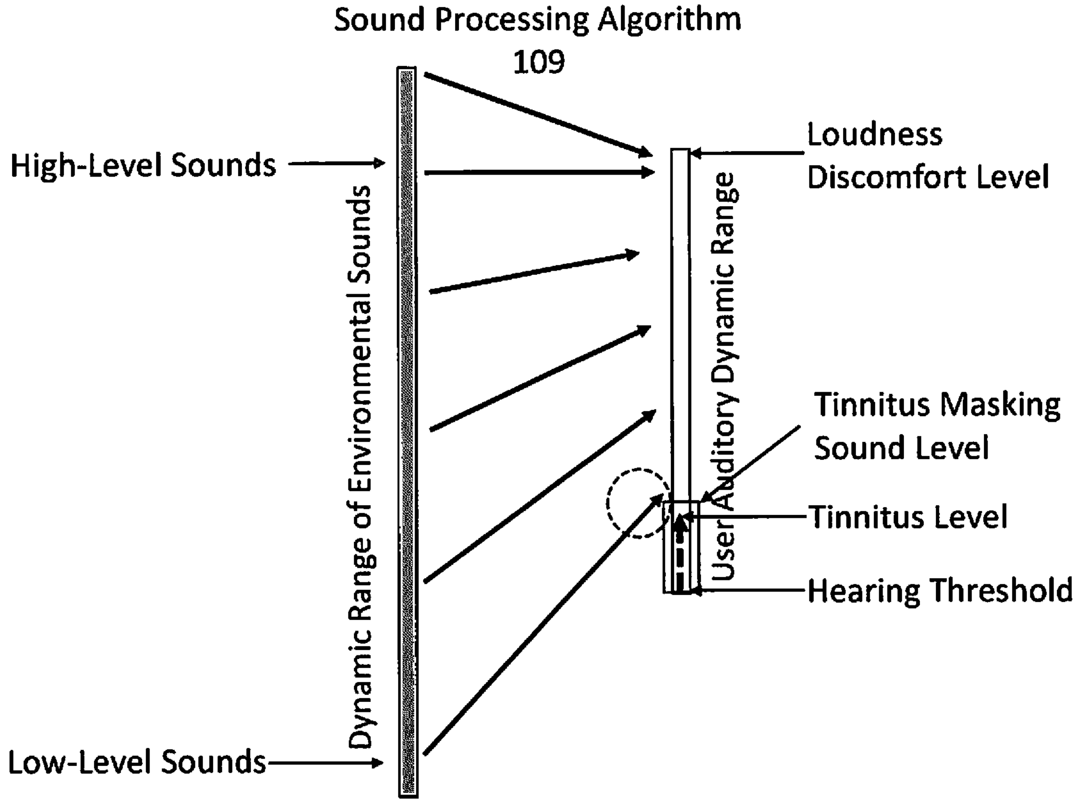
FIG. 14 illustrates the amount of amplification or attenuation in a sound processing algorithm.

FIG. 14 illustrates one variation in which the amount of amplification or attenuation in a sound processing algorithm, 109, for a user with tinnitus (alone or with hearing loss) which can be used as a guide for amplification and attenuation. The tinnitus estimation app estimates the frequency (ies) and level(s) of user's perceived tinnitus, the dynamic range app estimates the auditory dynamic range of the user at different frequencies, the tinnitus intervention app automatically generates a tinnitus masking noise and present the noise at a level slightly higher than the level(s) of the tinnitus to reduce the interference and annoyance of tinnitus. The amplification app then automatically changes the lower limit of the user's auditory dynamic range to a level slightly above the tinnitus level at this frequency. All the sounds are then amplified or attenuated to be within the newly defined auditory dynamic range at this frequency.

Figure 15:
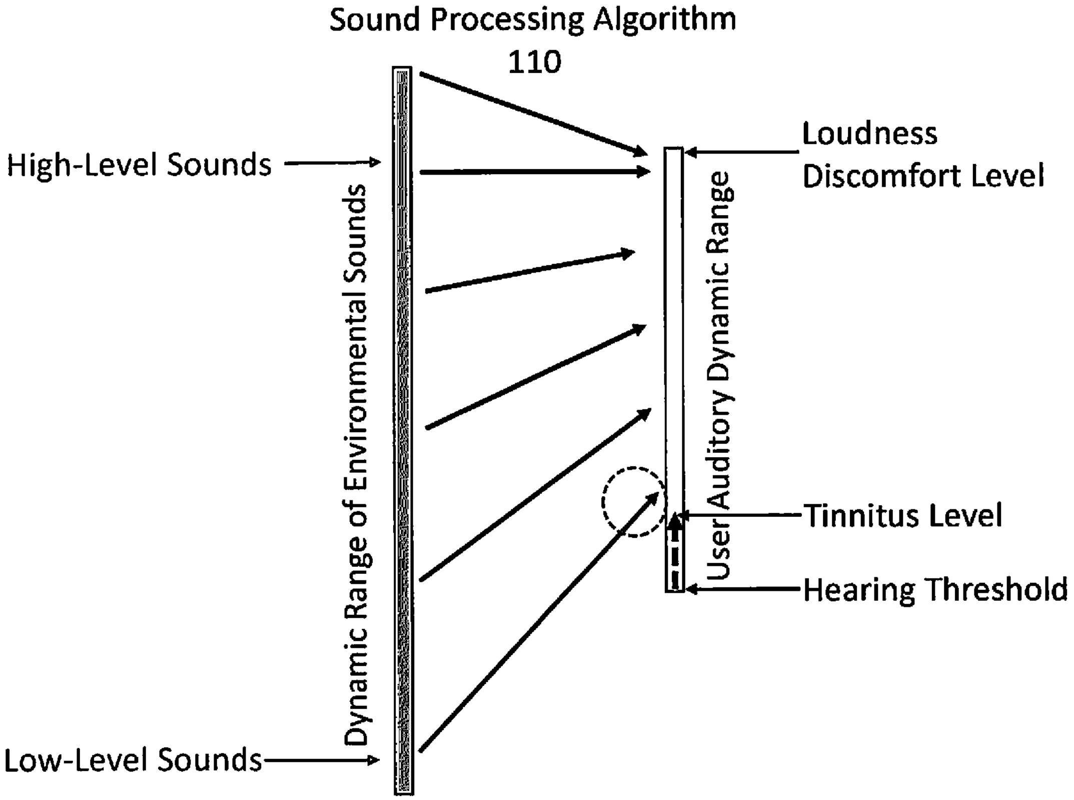
FIG. 15 illustrates the amount of amplification or attenuation in a sound processing algorithm, in a variation.

In another variation, the tinnitus estimation app estimates the frequency(ies) and level(s) of user's perceived tinnitus, and the dynamic range app estimates the auditory dynamic range of the user at different frequencies. The amplification app changes the lower limit of the auditory dynamic range to be at or slightly above the tinnitus level. FIG. 15 illustrates the amount of amplification or attenuation in a sound processing algorithm, 110, for a user with tinnitus (alone or with hearing loss). The amplification app automatically presents the environmental sounds or streamed sounds into the newly-defined auditory dynamic range. In another variation the user may have the choice of which tinnitus intervention to implement, such as those illustrated in FIG. 14, FIG. 15 and FIG. 16.

Figure 16:
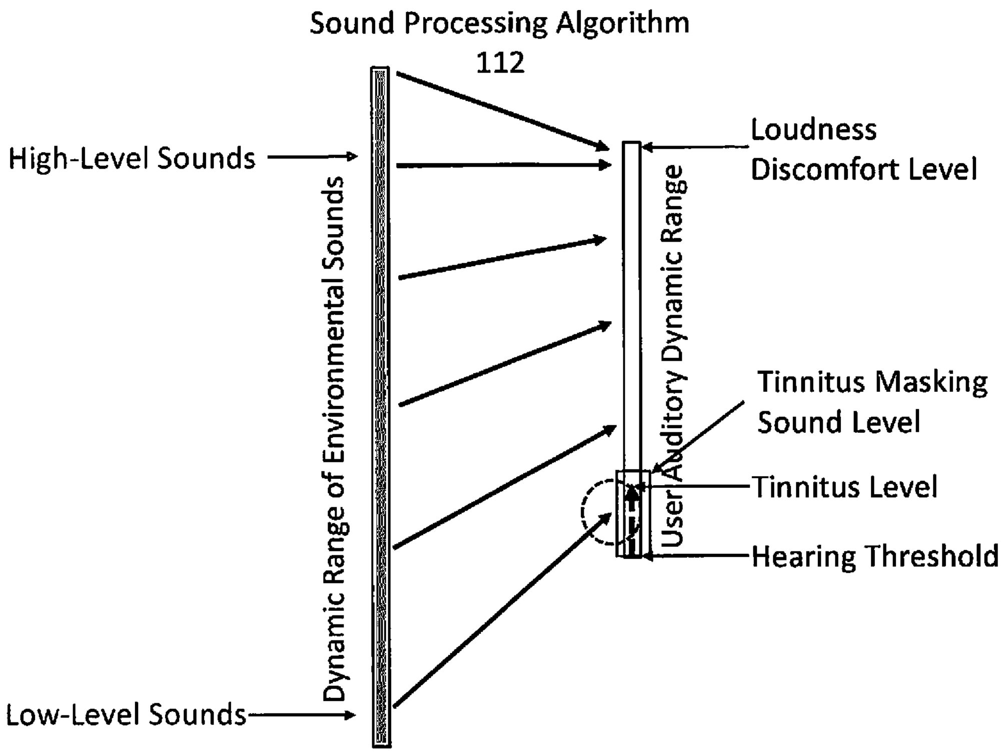
FIG. 16 illustrates the amount of amplification or attenuation in a sound processing algorithm, in another variation.

FIG. 16 illustrates another variation, in which the amount of amplification or attenuation in a sound processing algorithm, 112, for a user with tinnitus (alone or with hearing loss) is guided by the lower limit of the user's auditory dynamic range, taking the user's perceived tinnitus level into consideration. The tinnitus estimation app estimates the frequency(ies) and level(s) of user's perceived tinnitus, and the dynamic range app estimates the auditory dynamic range of the user at different frequencies. The amplification app presents audio signals at the original lower limit of the auditory dynamic range of the user or at a level slightly higher than the original lower limit.

In case of misophonia, one or a set of sound learning apps, which can be an independent application or a part of other app(s) implemented in the user device, obtain the characteristics of sound samples that would trigger misophonia for the user. One or a set of misophonia relief apps, which can be an independent application or a part of other app(s) implemented in the user device, change the spectral, temporal, and/or intensity of the triggering sound so that the intensity of the triggering sound is reduced to below the hearing thresholds of the user, omitted from the audio signal at the output of the sound delivering device, or changed to a sound with different spectral, temporal, or intensity characteristics. The goal is to reduce or minimize the negative emotional and psychological reactions from the user caused by the triggering sound.

Figure 17:
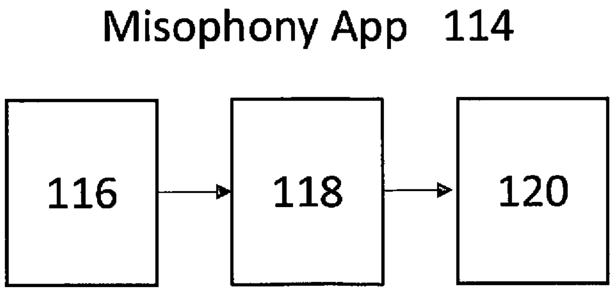
FIG. 17 is a flow chart of an example of a misophony app.

FIG. 17 is a flow chart for a misophony app, 114, which includes receiving from the user, or a sound identified by the user, 116, as triggering misophonia, then a sound learning app, 118, then identifies characteristics of the sound, such as frequency spectrum and intensity, as varies over time, and/or use machine-learning to learning to identify characteristics of the trigger sounds when multiple samples of the triggering sounds are provided. The misophonia relieve app, 120, then alter the spectral, temporal, and/or intensity characteristics of the trigger sound in the sound signal.

For users with misophonia, they can record several samples of the trigger sounds and the sound learning app will analyze the characteristics of the triggering sounds. The misophony relief app then detects the presence of sounds with similar characteristics as the triggering sounds and changes the spectral, temporal, and intensity characteristics of the triggering sounds so that it is not perceived or not recognized in order to reduce the negative emotional and psychological effects on the user.

In a variation, the misophony relief app reduces the output in the frequency channels containing the trigger sounds to be lower than the hearing thresholds of the user. In another variation, the misophony relief app alters the relative output levels of the frequency channels with the trigger sounds so that the triggering sound is perceived as a different sound. In another variation, the misophony relief app adds a masking sound whenever the triggering sound occurs so that the triggering sound is perceived as a different sound or a noise. In another variation, the misophony relief app generates a sound with the same spectral, temporal and intensity of the triggering sound but at 180 degrees out of phase, adds the generated sound into the audio signal with the triggering sound, to cancel the trigger sound before it is fed to the sound delivering transducer.

REFERENCES

1. Wilson B S, Tucci D L, Merson M H, O'Donoghue G M. Global hearing healthcare: new findings and perspectives. *Lancet* 2017; 390: 2503-15.
2. Ching, T. Y. C., Dillon, H., Marnane, V., Hou, S., Day, J., Seeto, M. et al. (2013). Outcomes of Early- and Late-identified Children at 3 Years of Age: Findings from a Prospective Population-based Study. Ear and Hearing, 34(5), 535-552. doi: 10.1097/AUD.0b013e3182857718.
3. Ronner E A, Benchetrit L, Levesque P, Basonbul R A, Cohen M S. 2020. Quality of Life in Children with Sensorineural Hearing Loss. Otolaryngol Head Neck Surg. 2020 January; 162(1):129-136.

4. Punch J L, Hitt R, Smith S W. 2019. Hearing loss and quality of life J Commun Disord. 2019 March-April; 78:33-45.
5. Bott, A. & Saunders, G. (2021). A scoping review of studies investigating hearing loss, social isolation and/or loneliness in adults. Int J Audiology, 60(sup2):30-46.
6. Chen, D. S., Genther, D. J., Betz, J., & Lin, F. R. (2014). Association Between Hearing Impairment and Self-Reported Difficulty in Physical Functioning. Journal of the American Geriatrics Society, 62(5), 850-856.
7. Davis, A., McMahon, C. M., Pichora-Fuller, K. M., Russ, S., Lin, F., Olusanya, B. O., Chadha, S., & Tremblay, K. L. (2016). Aging and Hearing Health: The Life-course Approach. The Gerontologist, 56(Suppl 2), S256-S267.
8. Dawes, P., Emsley, R., Cruickshanks, K. J., Moore, D. R., Fortnum, H., Edmondson-Jones, M., McCormack, A., & Munro, K. J. (2015). Hearing Loss and Cognition: The Role of Hearing Aids, Social Isolation and Depression. PLOS ONE, 10(3), e0119616.
9. Lin, F. R., Metter, E. J., O'Brien, R. J., Resnick, S. M., Zonderman, A. B., & Ferrucci, L. (2011). Hearing Loss and Incident Dementia. Archives of Neurology, 68(2).
10. Lin, F. R., Ferrucci, L., An, Y., Goh, J. O., Doshi, J., Metter, E. J., Davatzikos, C., Kraut, M. A., & Resnick, S. M. (2014). Association of hearing impairment with brain volume changes in older adults. NeuroImage, 90, 84-92.
11. Lin, F. R. (2012). Hearing Loss and Falls Among Older Adults in the United States. Archives of Internal Medicine, 172(4), 369.
12. Coverstone, J. A. (2018). Prevalence of hearing difficulty and tinnitus with normal hearing thresholds. Science and Research News. Accessed May 1, 2021. (available atwww.ata.org/sites/default/files/Summer-2018-36.pdf)
13. American Tinnitus Association (2022). Impact of tinnitus. Accessed May 1, 2021. (available at www.ata.org/understanding-facts/impact-tinnitus).
14. WebMD (2020). What is misophonia? Accessed May 1, 2021. (available at www.webmd.com/mental-health/what-is-misophonia).
15. Blamey (2005). Adaptive Dynamic Range Optimization (ADRO) A Digital Amplification Strategy for Hearing Aids and Cochlear Implants. Trends in Amplification, 9(2), 77-98.
16. Schuab A. (2008) Digital Hearing Aids. New York: Thieme Medical Publishers.
17. K. Chung "Challenges and Recent Developments in Hearing Aids: Part I Speech Understanding in Noise, Microphone Technologies and Noise Reduction Algorithms" *Trends In Amplification*, vol. 8, no. 3, pp. 83-124 (2004).
18. J. J. Lentz "Psychoacoustics: Perception of Normal and Impaired Hearing with Audiology Applications" Chapter 2 (2020).
19. J. J. Lentz "Psychoacoustics: Perception of Normal and Impaired Hearing with Audiology Applications" Chapter 4 (2020).

What is claimed is:

1. A method for personalized sound modification, with a personal sound system having; (i) a user device which includes a processor, and computer readable medium; (ii) a microphone, connected to the user device; and (iii) a sound output device, connected to the user device; the method for personalized sound modification comprising: providing a user hearing profile including lower and upper limits of the user's auditory dynamic range at a plurality of sound frequencies, wherein the user hearing profile was prepared with the user device and the sound output device of the personal sound system; receiving a sound signal from the microphone of the personal sound system; separating the sound signal into a plurality of frequency channels with the user device of the personal sound system; amplifying or attenuating sound at frequencies in the sound signal which have a volume level outside the lower or upper limits of the user's auditory dynamic range from the user hearing profile, respectively, and forming with the user device of the personal sound system a modified sound signal with which the sound output device will produce sounds within the user's auditory dynamic range; and providing the modified sound signal to the sound output device of the personal sound system.

2. The method of claim 1, further comprising testing the user to determine the lower and upper limits of the user's auditory dynamic range at a plurality of frequencies with the user device and the sound output device of the personal sound system, to prepare the user hearing profile.

3. The method of claim 2, wherein the user has tinnitus, and the testing further comprises estimating a tinnitus frequency and a tinnitus loudness level, with the user device and the sound output device of the personal sound system.

4. The method of claim 3, further comprising providing masking sounds in the modified sound signal at a loudness level higher than the tinnitus loudness level at the tinnitus frequency.

5. The method of claim 3, wherein the lower limit of the user's auditory dynamic range in the user hearing profile is set higher than the tinnitus loudness level at the tinnitus frequency.

6. The method of claim 2, wherein the user has misophonia, and the testing further comprises recording a sound which triggers the user's misophonia.

7. The method of claim 6, wherein the modified sound signal is adjusted to mask, alter or eliminate the sound which triggers the user's misophonia.

8. The method of claim 1, wherein the user device is a smartphone, the smartphone comprises the microphone, and the sound output device is earbuds or headphones.

9. A computer program product, comprising a non-transitory computer readable medium having a computer readable program code embodied therein, the computer readable program code adapted to be executed to implement a method for personalize d sound modification with a personal sound system, the method comprising: providing a user hearing profile including lower and upper limits of the user's auditory dynamic range at a plurality of sound frequencies, wherein the user hearing profile was prepared with the user device and the sound output device of the personal sound system; receiving a sound signal from the microphone of the personal sound system; separating the sound signal into a plurality of frequency channels with the user device of the personal sound system; amplifying or attenuating sound at frequencies in the sound signal which have a volume level outside the lower or upper limits of the user's auditory dynamic range from the user hearing profile, respectively, and forming with the user device of the personal sound system a modified sound signal with which the sound output device will produce sounds within the user's auditory dynamic range; and providing the modified sound signal to the sound output device of the personal sound system; wherein the personal sound system comprise: (i) a user device which includes a processor, and the non-transitory computer readable medium; (ii) a microphone, connected to the user device; and (iii) a sound output device, connected to the user device.

10. The computer program product of claim 9, wherein the method further comprises testing the user to determine the lower and upper limits of the user's auditory dynamic range at a plurality of frequencies with the user device and the sound output device of the personal sound system, to prepare the user hearing profile.

11. The computer program product of claim 10, wherein the user has tinnitus, and the testing further comprises estimating a tinnitus frequency and a tinnitus loudness level, with the user device and the sound output device of the personal sound system.

12. The computer program product of claim 11, wherein the method further comprises providing masking sounds in the modified sound signal at a loudness level higher than the tinnitus loudness level at the tinnitus frequency.

13. The computer program product of claim 11, wherein the lower limit of the user's auditory dynamic range in the user hearing profile is set higher than the tinnitus loudness level at the tinnitus frequency.

14. The computer program product of claim 10, wherein the user has misophonia, and the testing further comprises recording a sound which triggers the user's misophonia.

15. The computer program product of claim 14, wherein the modified sound signal is adjusted to mask or eliminate the sound which triggers the user's misophonia.

16. A system for personalized sound modification, comprising: (1) a personal sound system, having (i) a user device which includes a processor, and non-transitory computer readable medium, (ii) a microphone, connected to the user device, and (iii) a sound output device, connected to the user device, and (2) a computer program product, comprising the non-transitory computer readable medium having a computer readable program code embodied therein, the computer readable program code adapted to be executed to implement a method for personalized sound modification with the personal sound system, the method comprising: providing a user hearing profile including lower and upper limits of the user's auditory dynamic range at a plurality of sound frequencies, wherein the user hearing profile was prepared with the user device and the sound output device of the personal sound system; receiving a sound signal from the microphone of the personal sound system; separating the sound signal into a plurality of frequency channels with the user device of the personal sound system; amplifying or attenuating sound at frequencies in the sound signal which have a volume level outside the lower or upper limits of the user's auditory dynamic range from the user hearing profile, respectively, and forming with the user device of the personal sound system a modified sound signal with which the sound output device will produce sounds within the user's auditory dynamic range; and providing the modified sound signal to the sound output device of the personal sound system.

17. The system of claim 16, wherein the method further comprises testing the user to determine the lower and upper limits of the user's auditory dynamic range at a plurality of frequencies with the user device and the sound output device of the personal sound system, to prepare the user hearing profile.

18. The system of claim 17, wherein the user has tinnitus, and the testing further comprises estimating a tinnitus frequency and a tinnitus loudness level, with the user device and the sound output device of the personal sound system.

19. A method for personalized sound modification for user having tinnitus, with a personal sound system having: (i) a user device which includes a processor, and computer readable medium; (ii) a microphone, connected to the user device; and (iii) a sound output device, connected to the user device; the method for personalized sound modification comprising:

testing the user to estimate a tinnitus frequency and a tinnitus loudness level, with the user device and the sound output device of the personal sound system:

receiving a sound signal from the microphone of the personal sound system:

providing masking sounds in the sound signal at a loudness level higher than the tinnitus loudness level at the tinnitus frequency, and forming with the user device of the personal sound system a modified sound signal with which the sound output device will produce sounds; and providing the modified sound signal to the output device of the personal sound system.

* * * * *